US008891271B2

(12) United States Patent
Ramorini et al.

(10) Patent No.: US 8,891,271 B2
(45) Date of Patent: Nov. 18, 2014

(54) ENERGY SCAVENGING INTERFACE, METHOD FOR OPERATING THE ENERGY SCAVENGING INTERFACE, AND ENERGY HARVESTING SYSTEM COMPRISING THE ENERGY SCAVENGING INTERFACE

(75) Inventors: Stefano Ramorini, Arluno (IT); Alessandro Gasparini, Cusano Milanino (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 176 days.

(21) Appl. No.: 13/469,460

(22) Filed: May 11, 2012

(65) Prior Publication Data
US 2012/0307538 A1 Dec. 6, 2012

(30) Foreign Application Priority Data

May 30, 2011 (IT) .............................. TO2011A0474

(51) Int. Cl.
H02M 7/217 (2006.01)
B60C 23/04 (2006.01)
H02M 7/219 (2006.01)
H02M 7/00 (2006.01)

(52) U.S. Cl.
CPC ........... *H02M 7/219* (2013.01); *B60C 23/0411* (2013.01); *B60C 23/041* (2013.01)
USPC .......................................... 363/127; 363/125

(58) Field of Classification Search
USPC ........................... 323/123, 125–127, 282–285
See application file for complete search history.

(56) References Cited

U.S. PATENT DOCUMENTS

| 5,923,154 | A  | * | 7/1999  | Moller .......................... 323/222 |
| 6,229,292 | B1 | * | 5/2001  | Redl et al. ..................... 323/285 |
| 7,466,112 | B2 | * | 12/2008 | Zhou et al. .................... 323/259 |
| 7,800,928 | B1 | * | 9/2010  | Dernovsek et al. ........... 363/132 |
| 8,159,204 | B2 | * | 4/2012  | Grant ............................ 323/285 |
| 2005/0110277 | A1 |  | 5/2005  | Adamson et al. |
| 2006/0237968 | A1 |  | 10/2006 | Chandrasekaran |
| 2009/0284886 | A1 | * | 11/2009 | Matsumoto .................. 361/93.7 |
| 2009/0309566 | A1 | * | 12/2009 | Shiu ............................. 323/283 |
| 2010/0084920 | A1 | * | 4/2010  | Banting et al. ................. 307/66 |
| 2010/0165686 | A1 | * | 7/2010  | Matzberger et al. .......... 363/127 |

OTHER PUBLICATIONS

Italian Search Report and Written Opinion for IT TO2011A000474 mailed Mar. 13, 2012 (10 pages).

(Continued)

*Primary Examiner* — Adolf Berhane
*Assistant Examiner* — Henry Lee, III
(74) *Attorney, Agent, or Firm* — Gardere Wynne Sewell LLP

(57) ABSTRACT

An energy scavenging interface has an input port receiving an electrical signal from a storage element of a transducer, and an output port supplying an output signal to an electrical load. The interface includes a first switch receiving the input signal; a second switch that supplying the output signal; and control logic configured to close the first switch and open the second switch for a first time interval having at least a first temporal duration and until current through the first switch reaches a threshold. A scaled copy of a peak value of current through the first switch is obtained during the first time interval. The control logic is further operable to open the first switch and close the second switch to supply current to the electrical load as long as the current of the output signal remains greater than the value of said scaled copy of the peak value.

31 Claims, 13 Drawing Sheets

(56) References Cited

OTHER PUBLICATIONS

Hasan, A., et al.: "Monolithic DC-DC Boost Converter With Current-Mode Hysteretic Control," Electrical and Computer Engineering (CCECE), 2011 24th Canadian Conerence On, IEEE, May 8, 2011, pp. 1242-1245.

Salmon, J. C. Ed—Institute of Electrical and Electronics Engineers: "Circuit Topologies for Single-Phase Voltage-Doubler Boost Rectifiers," IEEE, US, Feb. 23, 1992, pp. 549-556.

Shenck N. S., et al: "Energy Scavenging With Shoe-Mounted Piezoelectrics," IEEE Micro, IEEE Service Center, Los Alamitos, CA, US, vol. 21, No. 3, May 1, 2001, pp. 30-42.

Cao, Xinping, et al: "Electromagnetic Energy Harvesting Circuit With Feedforward and Feedback DC-DC PWM Boost Converter for Vibration Power Generator System," IEEE Transactions on Power Electronics, vol. 22, No. 2, Mar. 2007, pp. 679-685.

Dwari, Suman, et al: "An Efficient AC-DC Step-Up Converter for Low-Voltage Energy Harvesting," IEEE Transactions on Power Electronics, vol. 25, No. 8, Aug. 2010, pp. 2188-2199.

\* cited by examiner

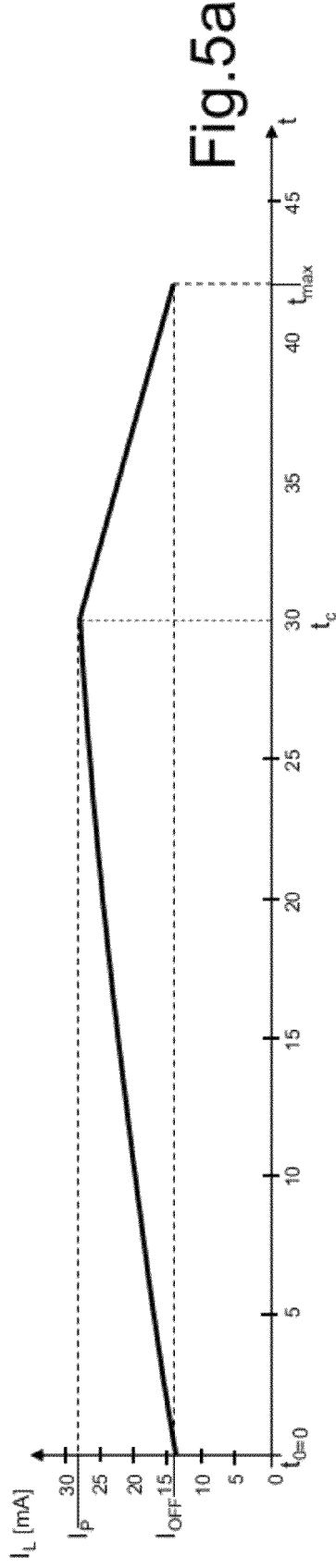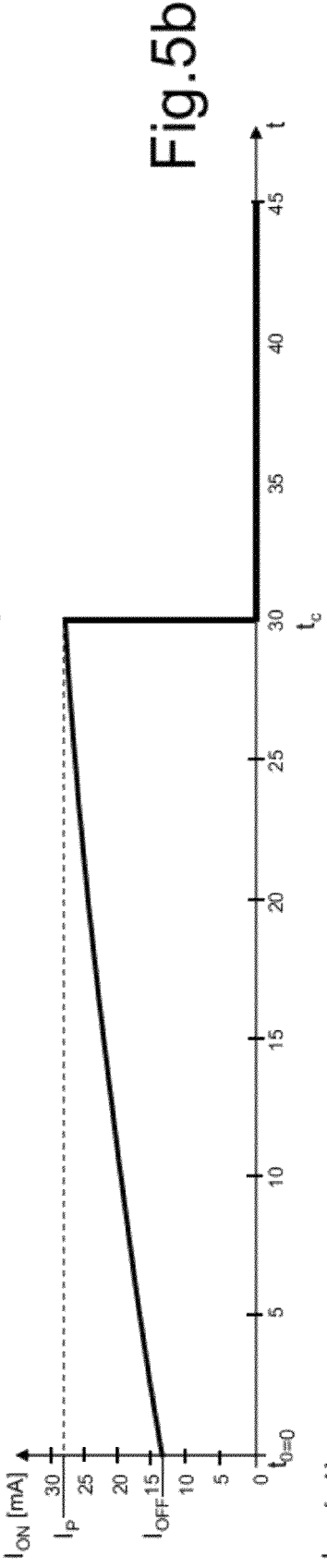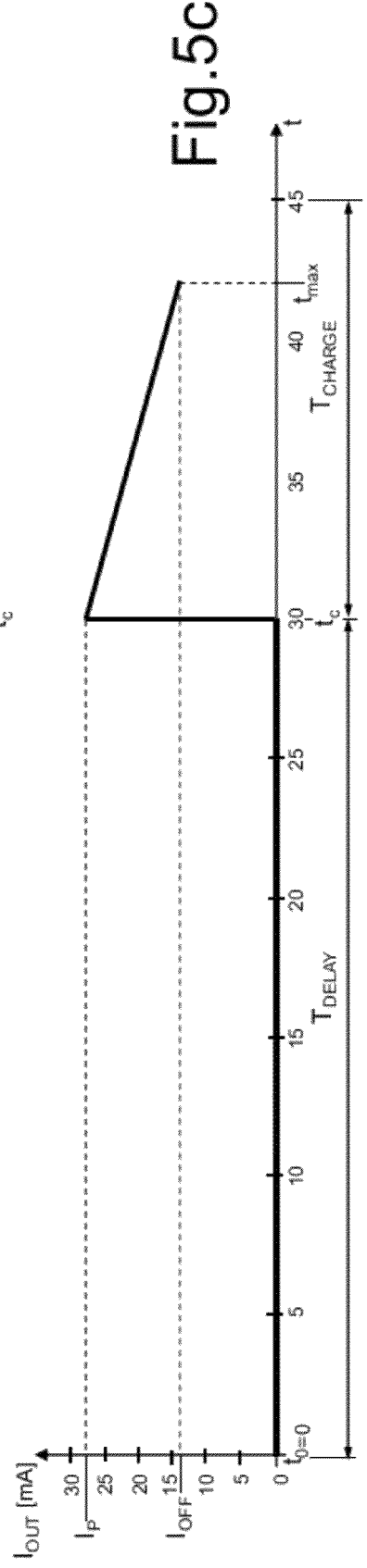

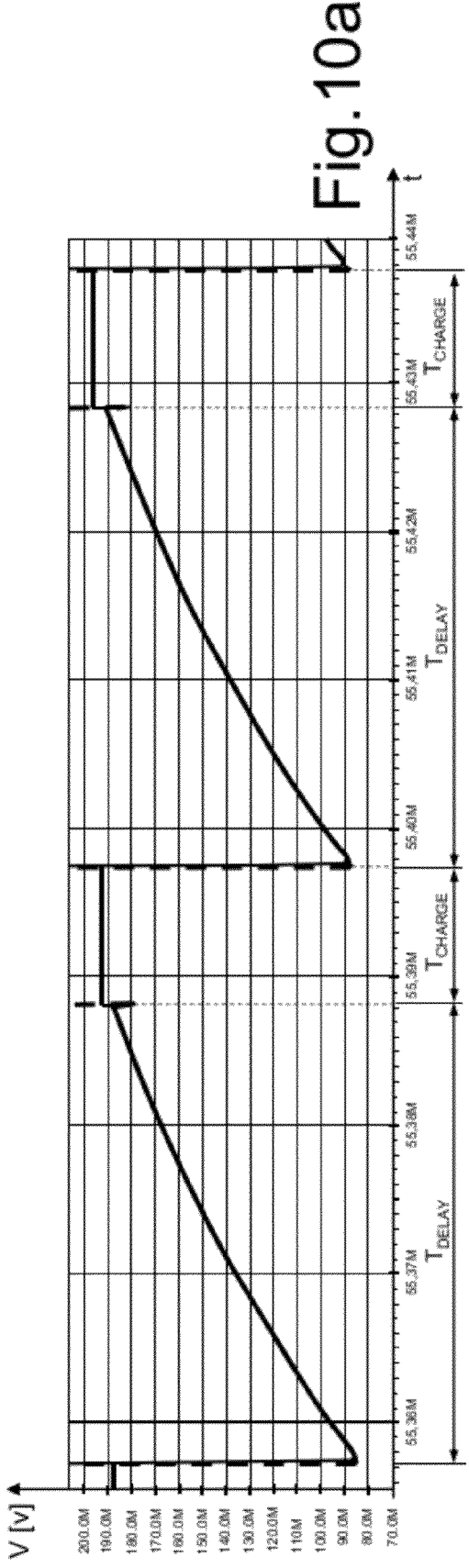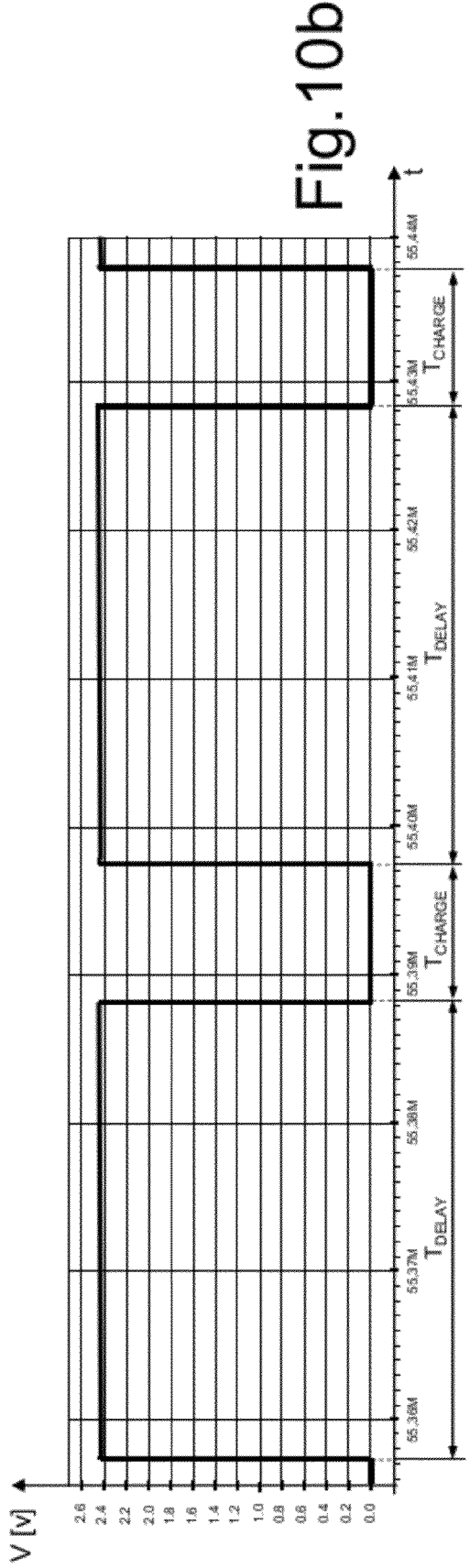

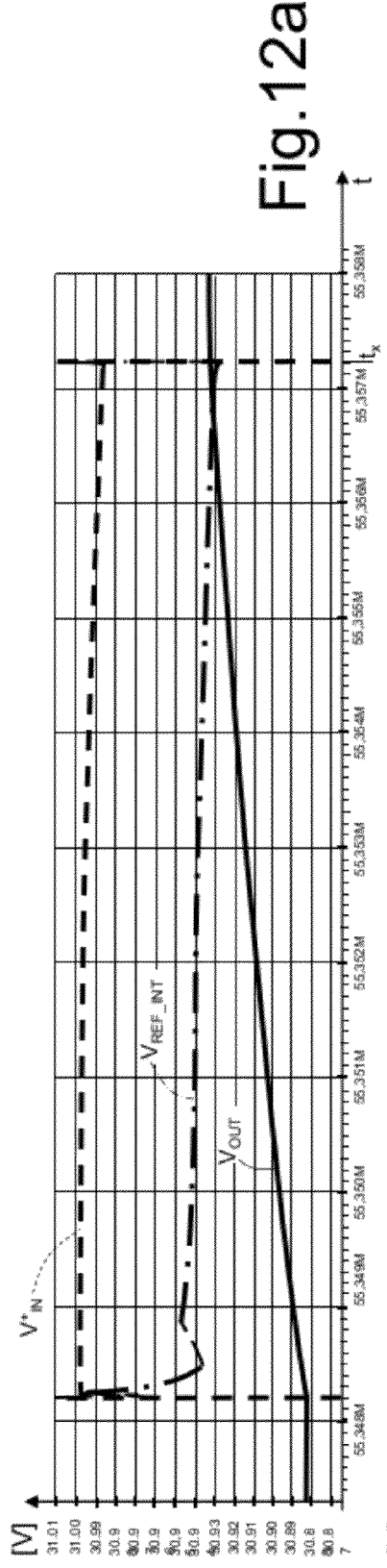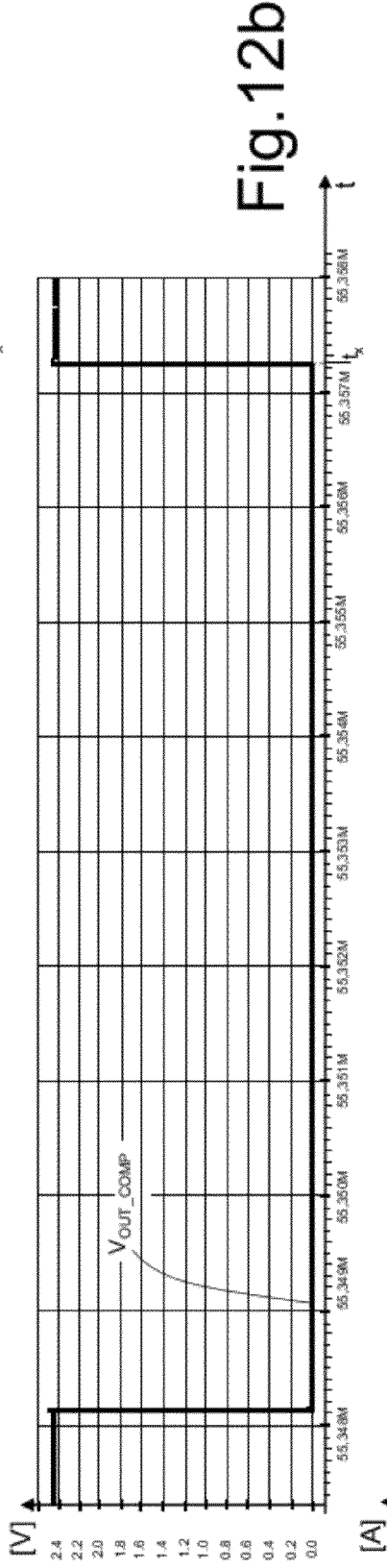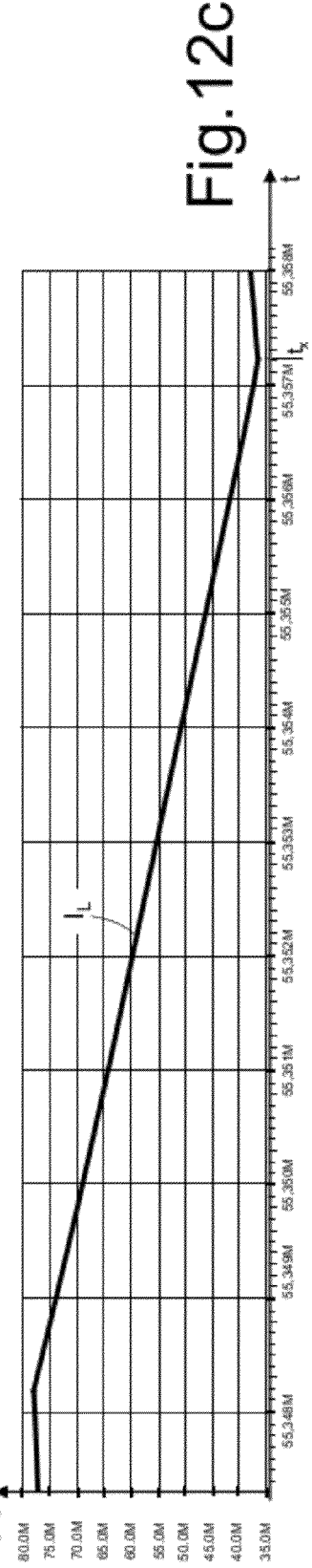

ENERGY SCAVENGING INTERFACE, METHOD FOR OPERATING THE ENERGY SCAVENGING INTERFACE, AND ENERGY HARVESTING SYSTEM COMPRISING THE ENERGY SCAVENGING INTERFACE

PRIORITY CLAIM

This application claims priority from Italian Application for Patent No. TO2011A000474 filed May 30, 2011, the disclosure of which is hereby incorporated by reference.

TECHNICAL FIELD

The present invention relates to a rectifier circuit adapted to form an energy scavenging interface, to a method for operating the rectifier circuit, and to an environmental-energy harvesting system comprising the rectifier circuit. The present invention moreover relates to an apparatus (for example, a vehicle) comprising the environmental-energy harvesting system.

BACKGROUND

As is known, systems for harvesting energy (also known as "energy harvesting systems" or "energy scavenging systems") from intermittent environmental energy sources (i.e., sources that supply energy in an irregular way) have aroused and continue to arouse considerable interest in a wide range of technological fields. Typically, energy harvesting systems are adapted to harvest, store, and transfer energy generated by mechanical sources to a generic load of an electrical type.

Low-frequency vibrations, such as for example mechanical vibrations of disturbance in systems with moving parts can be a valid source of energy. Mechanical energy is converted, by one or more appropriate transducers (for example, piezoelectric or electromagnetic devices) into electrical energy, which can be used for supplying an electrical load. In this way, the electrical load does not require batteries or other supply systems that are cumbersome and poorly resistant to mechanical stresses.

FIG. 1 is a schematic illustration, by means of functional blocks, of an energy harvesting system of a known type.

The energy harvesting system 1 of FIG. 1 comprises: a transducer 2, for example of an electromagnetic or piezoelectric type, subject during use to environmental mechanical vibrations and configured for converting mechanical energy into electrical energy, typically into AC voltages; a scavenging interface 4, for example comprising a diode-bridge rectifier circuit (also known as Graetz bridge), configured for receiving at input the AC signal generated by the transducer 2 and supplying at output a DC signal for charging a capacitor 5 connected to the output of the rectifier circuit 4; and a DC-DC converter 6, connected to the capacitor 5 for receiving at input the electrical energy stored by the capacitor 5 and supplying it to an electrical load 8. The capacitor 5 hence has the function of energy-storage element, energy which is made available, when required, to the electrical load 8 for operation of the latter.

The global efficiency $\eta_{TOT}$ of the energy harvesting system 1 is given by Eq. (1) below $$\eta_{TOT} = \eta_{TRANSD} \cdot \eta_{SCAV} \cdot \eta_{DCDC} \quad (1)$$

where: $\eta_{TRANSD}$ is the efficiency of the transducer 2, indicating the amount of energy available in the environment that has been effectively converted, by the transducer 2, into electrical energy; $\eta_{SCAV}$ is the efficiency of the scavenging interface 4, indicating the energy consumed by the scavenging interface 4 and the coupling factor $\eta_{COUPLE}$ between the transducer 2 and the scavenging interface 4 (indicating the impedance matching between the between the transducer 2 and the scavenging interface 4); and $\eta_{DCDC}$ is the efficiency of the DC-DC converter 6.

As is known, in order to supply to the load the maximum power available, the impedance of the load should be equal to that of the source. As illustrated in FIG. 2, the transducer 2 can be represented schematically, in this context, as a voltage generator 3 provided with a resistance $R_S$ of its own. The maximum power $P_{TRANSD}^{MAX}$ that the transducer 2 can supply at output may be defined as:

$$P_{TRANSD}^{MAX} = V_{TRANSD}^2 / 4R_S \text{ if } R_{LOAD} = R_S \quad (2)$$

where: $V_{TRANSD}$ is the voltage produced by the equivalent voltage generator; and $R_{LOAD}$ is the equivalent electrical resistance at the output of the transducer 2 (or, likewise, seen at input to the scavenging interface 4), which takes into due consideration the equivalent resistance of the scavenging interface 4, of the DC-DC converter 6, and of the load 8.

Due to the impedance mismatch ($R_{LOAD} \neq R_S$), the power at input to the scavenging interface 4 is lower than the maximum power available $P_{TRANSD}^{MAX}$.

The power $P_{SCAV}$ transferred to the capacitor 5 is a fraction of the power recovered by the interface, and is given by Eq. (3) below $$P_{SCAV} = \eta_{TRANSD} \cdot \eta_{SCAV} \cdot P_{TRANSD}^{MAX} \quad (3)$$

The power required of the DC-DC converter 6 for supplying the electrical load 8 is given by the following Eq. (4)

$$P_{LOAD} = P_{DCDC} \cdot \eta_{DCDC} \quad (4)$$

where $P_{DCDC}$ is the power received at input by the DC-DC converter 8, in this case coinciding with $P_{SCAV}$, and $P_{LOAD}$ is the power required by the electrical load.

The efficiency of the system 1 of FIG. 1 markedly depends upon the signal generated by the transducer 2.

The efficiency drops rapidly to the zero value (i.e., the system 1 is unable to harvest environmental energy) when the amplitude of the signal of the transducer 2 (signal $V_{TRANSD}$) assumes a value lower, in absolute value, than $V_{OUT} + 2V_{TH\_D}$, where $V_{OUT}$ is the voltage accumulated on the capacitor 5, and $V_{TH\_D}$ is the threshold voltage of the diodes that form the scavenging interface 4. As a consequence of this, the maximum energy that can be stored in the capacitor 5 is limited to the value $E_{max} = 0.5 \cdot C_{OUT} \cdot (V_{TRANSD}^{MAX} - 2V_{TH\_D})^2$. If the amplitude of the signal $V_{TRANSD}$ of the transducer 2 is lower than twice the threshold voltage $V_{TH\_D}$ of the diodes of the rectifier of the scavenging interface 4 (i.e., $V_{TRANSD} < 2V_{TH\_D}$), then the efficiency of the system 1 is zero, the voltage accumulated on the output capacitor 5 is zero, the environmental energy is not harvested and the electrical load 8 is not supplied.

SUMMARY

Embodiments of the present invention presented include a rectifier circuit adapted to form an energy scavenging interface, a method for operating the rectifier circuit, an environmental-energy harvesting system comprising the rectifier circuit, and an apparatus comprising the environmental-energy harvesting system that will enable the aforementioned problems and disadvantages to be overcome, and in particular that will present a high efficiency.

According to the present invention a rectifier circuit adapted to form an energy scavenging interface, a method for operating the rectifier circuit, an environmental-energy harvesting system comprising the rectifier circuit, and an apparatus comprising the environmental-energy harvesting system are consequently provided as defined in the annexed claims.

The energy scavenging interface (in particular, having the configuration of a rectifier circuit) can be connected between an input signal source (in particular, an AC voltage signal) and an electrical load (with the possible interposition of a DC-DC converter adapted to supply to the electrical load a voltage signal having a voltage level allowed by the electrical load).

The energy scavenging interface comprises, according to one embodiment, a first switch and a second switch, each having a control terminal, connected between the input and output terminals of the energy scavenging interface. In particular, the first switch is connected between the first input terminal of the energy scavenging interface and an output terminal at reference voltage, whilst the second switch is connected between the second input terminal of the energy scavenging interface and the output terminal at reference voltage.

The energy scavenging interface further comprises control logic, coupled to the control terminals of the first and second switches, configured for opening/closing the first and second switches by means of an appropriate control signal.

The energy scavenging interface moreover comprises a further third switch and fourth switch, each having a control terminal. The control logic is moreover configured for operating third and fourth switches for transferring at output the energy stored in the inductor.

The first, second, third, and fourth switches are, for example, n-channel MOSFETs having an internal diode (parasitic diode). In this case, the third and fourth switches can be operated in an active way (by actively controlling turning-on and turning-off of the MOSFETs), or in a passive way (by turning off the MOSFETs and exploiting the internal parasitic diode). Alternatively, the first, second, third, and fourth switches are obtained with a different technology; for example, they may be p-channel MOSFETs, or NPN or PNP bipolar transistors, IGBTs, or the like.

Present on the output of the energy scavenging interface is a capacitor, for storing the power transferred at output from the scavenging interface. In parallel to the capacitor there may be present an electrical load, which is supplied by means of the energy accumulated in the capacitor. As has already been said, between the capacitor and the electrical load there may be set a DC-DC converter, of a buck, or boost, or buck/boost type.

The energy scavenging interface is described in detail with reference to an application thereof, in particular as rectifier circuit of an energy harvesting system set between an AC voltage source and a storage element and/or an electrical load.

BRIEF DESCRIPTION OF THE DRAWINGS

For a better understanding of the present invention, preferred embodiments thereof are now described, purely by way of non-limiting example and with reference to the attached drawings, wherein:

FIGS. 5*a*-5*c* show, using one and the same time scale, the time plots of current signals of the energy harvesting system of FIG. 3 in the operating conditions of FIGS. 4*a* and 4*b*;

FIGS. 10*a* and 10*b* show, using one and the same time scale, the time plots of current signals in the circuit of FIG. 8, in particular in order to illustrate a step of passage between the operating condition of FIG. 4*a* and the operating condition of FIG. 4*b*;

FIGS. 12*a*-12*c* show, using one and the same time scale, the time plots of current signals in the circuit of FIG. 11;

DETAILED DESCRIPTION OF THE DRAWINGS

Figure 3:
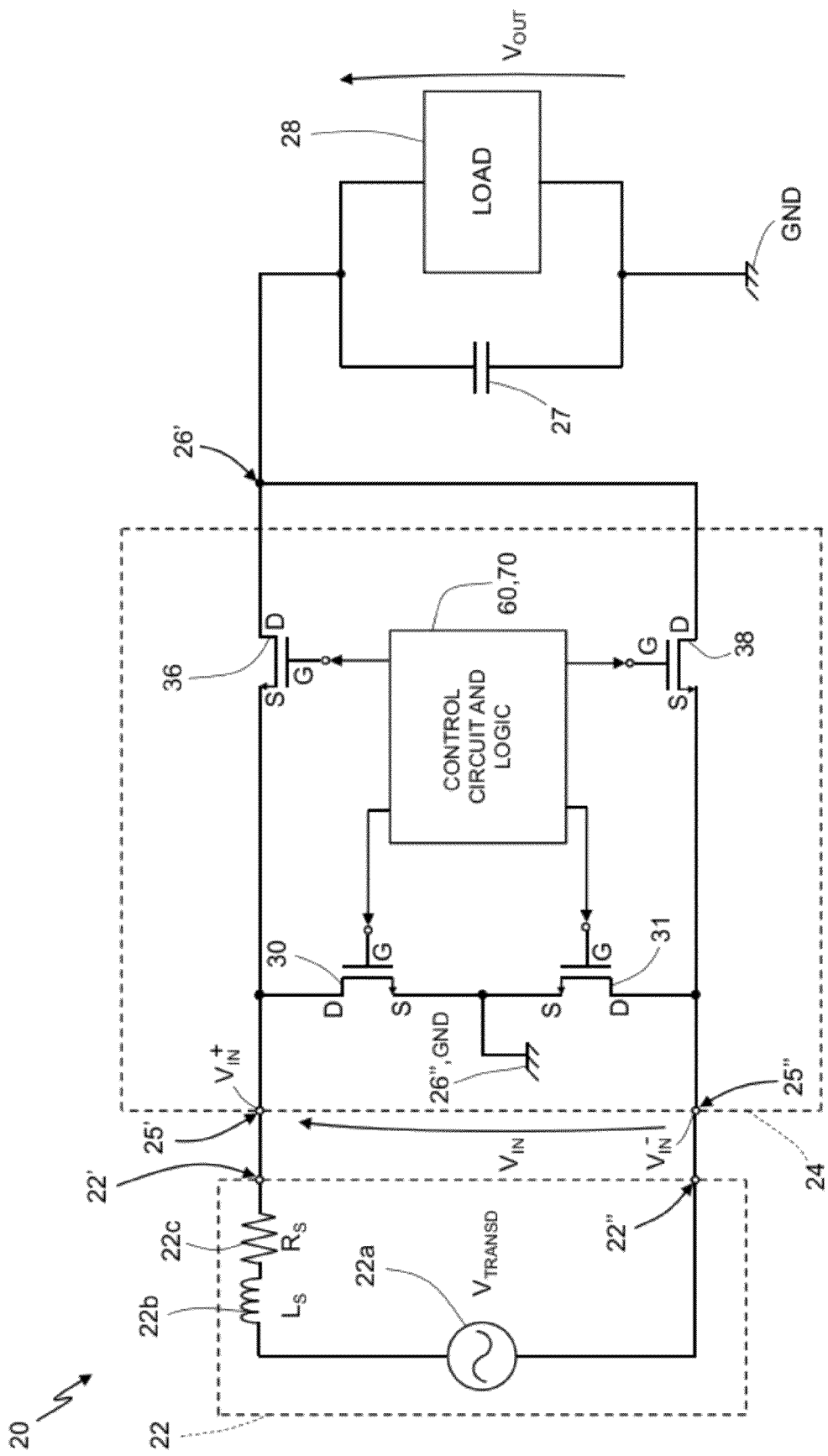
FIG. 3 shows an energy harvesting system comprising a scavenging-interface circuit that can be operated according to the steps of the method of FIG. 13, according to one embodiment of the present invention.

FIG. 3 shows an energy harvesting system 20 comprising a rectifier circuit 24, according to one embodiment.

In general, the energy harvesting system 20 comprises: a transducer 22 (similar to the transducer 2 of FIG. 1) including output terminals 22', 22" of its own; the rectifier circuit 24, including a first input terminal 25' and a second input terminal 25", which are electrically coupled, respectively, to the output terminals 22', 22" of the transducer 22, and a first output terminal 26' and a second output terminal 26"; and a storage element 27, for example a capacitor, connected between the first and second output terminals 26', 26" of the rectifier circuit 24, and configured for storing electrical charge supplied at output by the rectifier circuit 24.

According to one embodiment, the second output terminal 26" is a terminal at reference voltage, for example at ground voltage GND, e.g., at approximately 0 V. Other reference voltages can be used.

The transducer 22 is, for example, an electromagnetic transducer, and is shown schematically so as to include a voltage generator 22*a*, adapted to supply a voltage $V_{TRANSD}$, an inductor 22*b* (typical of the electromagnetic transducer), having a value of inductance $L_S$, and a resistor 22*c*, having a value of resistance $R_S$, connected in series to the inductor 22*b*.

On the output of the rectifier circuit 24, in parallel to the storage element 27, there may be connected an electrical load 28, adapted to be supplied by the charge stored in the storage element 27 or by means of a DC-DC converter (not shown in the figure) in the case where the electrical load requires a voltage value different from the one generated at output by the rectifier circuit 24.

Connected between the first input terminal 25' and the second output terminal 26" of the rectifier circuit 24 is a first switch 30, in particular of a voltage-controlled type. The first switch 30 is, for example, an n-type MOSFET. Connected between the first input terminal 25' and the first output terminal 26' is a second switch 36, in particular of a voltage-controlled type. Also the second switch 36 is, for example, an n-type MOSFET.

In addition, the rectifier circuit 24 comprises a third switch 31, connected between the second input terminal 25" and the second output terminal 26" of the rectifier circuit 24, and a fourth switch 38, connected between the second input terminal 25" and the first output terminal 26'. In a way similar to what has been said for the first and second switches 30, 38, also the third and fourth switches 31, 36 are, for example, n-type MOSFETs.

For simplicity of description in what follows the first, second, third, and fourth switches 30, 36, 31, and 38 will be referred to as first transistor 30, second transistor 36, third transistor 31, and fourth transistor 38, respectively, without this implying any loss of generality. Likewise, by the term "transistor closed" is meant in what follows a transistor biased in such a way as to enable conduction of electric current between its source and drain terminals, i.e., configured for behaving as a closed switch, and by the term "transistor open" is meant in what follows a transistor biased in such a way as to not enable conduction of electric current between its source and drain terminals, i.e., configured for behaving as an open switch.

In greater detail, the drain terminal D of the first transistor 30 is connected to the first input terminal 25' of the rectifier circuit 24, and the source terminal S of the first transistor 30 is connected to the second output terminal 26". The drain terminal D of the second transistor 36 is connected to the first output terminal 26' of the rectifier circuit 24, and the source terminal S of the second transistor 36 is connected to the first input terminal 25'.

The source terminal S and drain terminal D of the third transistor 31 are connected, respectively, to the second output terminal 26" and to the second input terminal 25" of the rectifier circuit 24; the source terminal S and drain terminal D of the fourth transistor 38 are connected, respectively, to the second input terminal 25" and to the first output terminal 26' of the rectifier circuit 24.

During positive half-cycles of the input voltage $V_{IN}$, voltage rectification is carried out by means of the first and second transistors 30 and 36. Further, during negative half-cycles of the input voltage $V_{IN}$, voltage rectification is carried out by means of the third and fourth transistors 31 and 38.

For operating the rectifier circuit 24, according to one embodiment, the rectifier circuit 24 further comprises a control circuit and control logic, which are designated in FIG. 3 by the reference numbers 60 and 70, and better described with reference to FIGS. 8 and 13. In particular, the control logic 60 implements the steps of the method of FIG. 13.

Figure 4A:
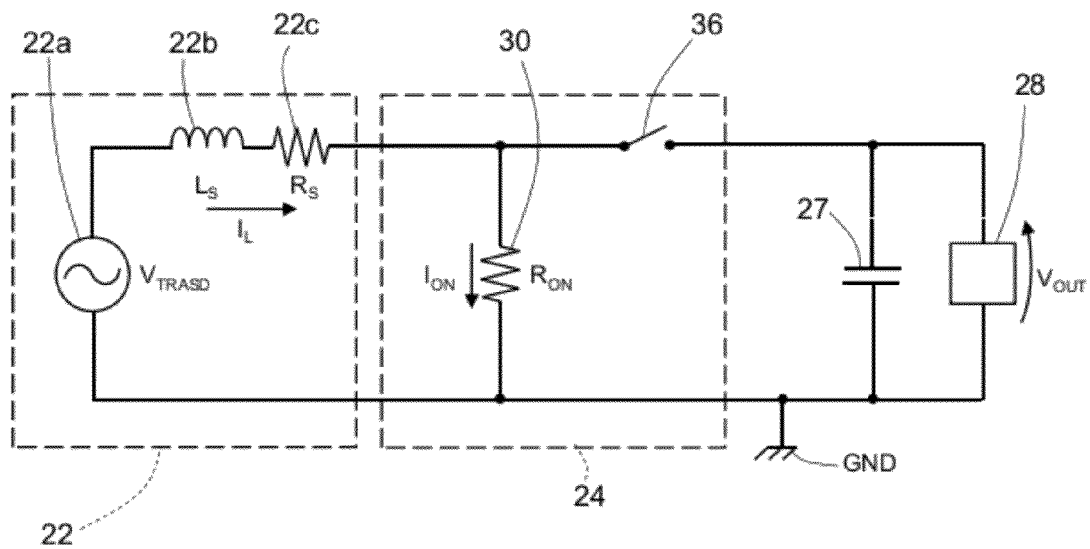
FIGS. 4*a* and 4*b* show the energy harvesting system of FIG. 3 in respective temporally successive operating conditions.

In use, the first and third transistors 30 and 31 are kept closed for a time interval $T_{DELAY}$ (chosen as will be better specified in what follows) so as to store energy in the inductor 22b (situation shown schematically in FIG. 4a).

Then, once the time interval $T_{DELAY}$ has elapsed and a minimum threshold value $I_{TH}$ has been reached for the current in the inductor 22b, the first and second transistors 30 and 36 (or, likewise, the third and fourth transistors 31, 38 in the case of negative half-waves of the voltage $V_{IN}$) are controlled so as to transfer the energy accumulated to the capacitor 27/load 28. This situation is shown schematically in FIG. 4b.

The input signal $V_{IN}$ is, as has been said, an irregular signal, in particular an AC voltage signal having polarity variable in time. Once the time interval $T_{DELAY}$ has elapsed and a minimum threshold value $I_{TH}$ has been reached for the current that flows in the inductor 22b, for positive polarities of the input signal $V_{IN}$, the third transistor 31 is kept closed whilst the first transistor 30 is opened. The fourth transistor 38 is kept open, and the second transistor 36 is closed, enabling a transfer of energy from the inductor 22b to the capacitor 27/load 28 through the second transistor 36. Likewise, for negative polarities of the input signal $V_{IN}$, the first transistor 30 is kept closed, whilst the third transistor 31 is opened. The second transistor 36 is kept open, whilst the fourth transistor 38 is closed, thus enabling transfer of energy from the inductor 22b to the capacitor 27/load 28 through the fourth transistor 38.

Hence, in summary, at the end of the pre-set time $T_{DELAY}$, the first transistor 30 (or alternatively the third transistor 31 according to the polarity of the current stored) is opened, and the current accumulated in the inductor 22b is transferred at output to the storage element 27 by means of the second transistor 36 (or alternatively the fourth transistor 38, according to the polarity of the current stored) causing an increase of the voltage $V_{OUT}$.

The steps described for operating the first and second transistors 30, 36 for positive values of polarity of the input signal $V_{IN}$ are similar to the steps for operating the third and fourth transistors 31, 38 for negative values of polarity of the input signal $V_{IN}$. Likewise, the circuit structure of the rectifier 24 is symmetrical. In what follows, operation of the rectifier 24 will be described more fully with reference to a circuit model that applies to one polarity (in particular the positive polarity) of the input signal $V_{IN}$.

FIG. 4a shows a circuit equivalent to the circuit of FIG. 3 for positive half-waves of the input voltage $V_{IN}$. The second transistor 36 is open, and the first transistor 30 is closed. In this operating condition, the first transistor 30 is closed, replaced by a resistor having resistance $R_{ON}$ (on-state resistance of the first transistor 30).

In addition, the third transistor 31 is driven into the closed state and the fourth transistor 38 is driven into the open state.

The current $I_L$ that flows in the inductor 22b is equal to the current $I_{ON}$ that traverses the first transistor 30 in the on state. The value of the current $I_L$ increases until it reaches a maximum value, or peak value, $I_p$ (see the plot of FIG. 5a).

The curve of $I_L$ has an evolution in time given by:

$$I_L = I_{ON} = \frac{V_{TRANSD}}{R_S}\left(1 - e^{-\frac{t}{\tau}}\right) - I_{OFF} \cdot e^{-\frac{t}{\tau}}$$

The current $I_{ON}$ reaches the peak value $I_p$ at time $t=t_c=T_{DELAY}$. For simplicity, it is assumed that the starting instant $t_0$ is equal to zero.

Figure 4B:
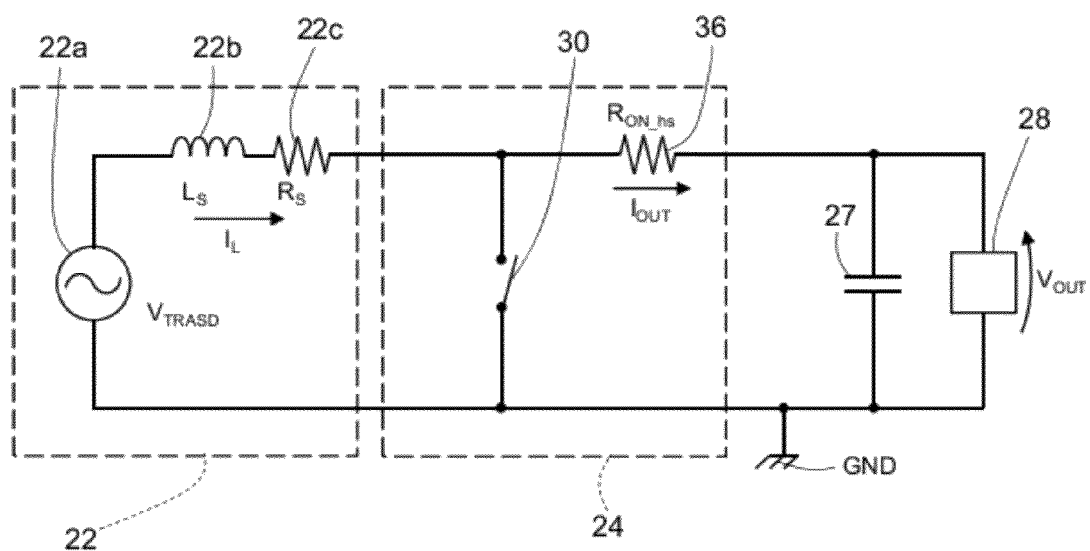

Once the time interval $T_{DELAY}$ has elapsed, and assuming that the current $I_L$ that flows in the inductor 22b has reached a value equal to, or higher than, the threshold value $I_{TH}$, there is a passage to the operating condition shown schematically in FIG. 4b.

The time interval $T_{DELAY}$ is the interval elapsing between the instant of closing of the first transistor 30 ($t_0$) and the instant of opening of the first transistor 30 ($t_c$).

The threshold current value $I_{TH}$ is chosen on the basis of the current peak values $I_p$ that are reached according to the application of the rectifier circuit 24.

These values depend upon the characteristics of the transducer 22 and upon the environmental stresses to which the transducer 22 is subjected. In particular, the threshold current value $I_{TH}$ is chosen much lower than the peak value $I_p$ that it is expected to reach in the application in which the rectifier circuit 24 is used. For example, if we assume that peak values $I_p$ of approximately 150 mA are reached, the threshold $I_{TH}$ can be chosen comprised between approximately 5 mA and 10 mA. It is to be noted that the choice of a threshold current $I_{TH}$ too close to the peak value $I_p$ entails a low efficiency. In fact, according to what has been described, current is transferred at output only when the threshold $I_{TH}$ is exceeded; all the portions of signal $V_{TRANSD}$ that generate a current with peak value $I_p < I_{TH}$ do not give any contribution of charge transferred at output.

With reference to FIG. 4b, at time $t_c$, the first transistor 30 is opened, and the current $I_L$ that flows in the inductor 22b is the current $I_{OUT}$ supplied at output by the rectifier 24. The current in the inductor 22b decreases with a constant slope, until it reaches the pre-defined value $I_{OFF}$ (at time $t_{max}$, see again FIG. 5a, where the inductor 22b is completely discharged), according to the relation:

$$\frac{dI_L}{dt} = \frac{V_{OUT} + R_S \cdot \frac{I_P + I_{OFF}}{2} - V_{TRANSD}}{L_S}$$

The value $I_{OFF}$ is given by $I_p/K$, with K constant (greater than 1) chosen as explained hereinafter. From the formula for $I_{OFF}$ indicated above, the following formula is obtained for $I_p$:

$$I_P = \frac{V_{TRANSD}}{R_S} \cdot \frac{\left(1 - e^{-\frac{T_{DELAY}}{\tau}}\right)}{1 - \frac{1}{K} e^{-\frac{T_{DELAY}}{\tau}}}$$

FIG. 5a shows the plot of the current $I_L$ in time t. The curve of the current $I_L$ reaches the peak value $I_p$ at instant $t_c$, in which the first transistor 30 is opened (see FIG. 5b).

Then, between $t_c$ and $t_{max}$ (time interval $T_{CHARGE}$) the current $I_L$ decreases until it reaches the value $I_{OFF} = I_p/K$.

FIG. 5b shows, using the same time scale as that of FIG. 5a, the plot of the current $I_{ON}$ that flows through the first transistor 30.

In the time interval $t_0$-$t_c$ the current $I_{ON}$ follows the same pattern as the current $I_L$ (we are, in fact, in the situation of FIG. 4a); at instant $t_c$, the first transistor 30 is opened (FIG. 5b) and the current $I_{ON}$ drops to zero.

FIG. 5c shows, using the same time scale as that of FIGS. 5a and 5b, the plot of the output current $I_{OUT}$. The current $I_{OUT}$ remains at a zero value during the time interval $t_0$-$t_c$, and then reaches the peak value $I_p$ at instant $t_c$. Then, between $t_c$ and $t_{max}$ (time interval $T_{CHARGE}$), the output current $I_{OUT}$ follows the same pattern as the current $I_L$.

The time interval $T_{CHARGE}$ is given by $$T_{CHARGE} = L_S \cdot \frac{I_P - I_{OFF}}{V_{OUT} + R_S \cdot \frac{I_P + I_{OFF}}{2} - V_{TRANSD}}$$

At time $t_{max}$, the first transistor 30 is again closed, and the inductor 22b is charged, according to what has already been described. The steps of charging and discharging of the inductor 22b (and, consequently, of supply of the capacitor 27/load 28) are repeated in a cyclic way.

The integral of the curve of $I_{OUT}$ (FIG. 5c) between time $t_c$ and time $t_{max}$ indicates the charge $Q_{CYCLE}$ transferred between the input and the output of the rectifier 24 in time $T_{CHARGE}$. In order to maximize the efficiency of transfer of charge between the input and the output of the rectifier 24, it is expedient to maximize the value of the power $P_{CYCLE}$ transferred at output by the rectifier circuit 24 at each cycle of charge/discharge of the inductor 22b. The power $P_{CYCLE}$ is defined as $P_{CYCLE} = V_{OUT} \cdot I_{CYCLE}$, where $I_{CYCLE}$ is given by $I_{CYCLE} = Q_{CYCLE}/T_{CYCLE}$, where $T_{CYCLE}$ the time interval elapsing between $t_0$ and $t_{max}$ ($T_{CYCLE} = T_{DELAY} + T_{CHARGE}$).

The present applicant has found that $P_{CYCLE}$ is given by the following relation:

$$P_{CYCLE} = \frac{\frac{I_{ON} + I_{OFF}}{2} \cdot T_{CHARGE}}{T_{DELAY} + T_{CHARGE}} \cdot V_{OUT}$$

In addition, the time interval $T_{CHARGE}$ is given by the following relation:

$$T_{CHARGE} = \frac{L_S(I_{ON} - I_{OFF})}{V_{OUT} + R_S \cdot \frac{I_{ON} + I_{OFF}}{2} - V_{TRANSD}}$$

From the previous relations, we obtain that $P_{CYCLE}$ is given by the following formula:

$$P_{CYCLE} = \frac{\frac{1}{2} \cdot \frac{V_{TRANSD}}{R_S} \cdot \frac{1 + e^{-\frac{T_{DELAY}}{\tau}}}{1 - \frac{1}{K} e^{-\frac{T_{DELAY}}{\tau}}} \cdot \left(1 + \frac{1}{K}\right)}{1 + \frac{1}{2} \cdot \frac{T_{DELAY}}{\tau} \cdot \frac{K+1}{K-1} + \frac{T_{DELAY} \cdot (V_{OUT} - V_{TRANSD})}{\tau \cdot V_{TRANSD} \cdot \frac{1 - e^{-\frac{T_{DELAY}}{\tau}}}{1 - \frac{1}{K} e^{-\frac{T_{DELAY}}{\tau}}} \cdot \left(1 + \frac{1}{K}\right)}}$$

The power $P_{CYCLE}$ is a function of the design parameters $T_{DELAY}$ and K, and of the external variables $V_{TRANSD}$ (voltage of the transducer, which is unpredictable) and $V_{OUT}$ (voltage on the capacitor 27, which is also unpredictable). Maximizing the value of $P_{CYCLE}$ hence means finding the optimal values of $T_{DELAY}$ and K, such that the curve of $P_{CYCLE}$ reaches a maximum value, or a value close to the maximum value, or an optimal value which can be defined according to the particular application and design requirements.

The curve of $P_{CYCLE}$ reaches an optimal value when the output of the transducer 22 and the input of the rectifier circuit 24 present the same impedance (that is, they are matched). The best coupling efficiency $\eta_{COUPLE}$ between the transducer 22 and the rectifier circuit 24 is given by $P_{CYCLE}^{OPT}/P_{TRANSD}^{MAX}$, where $P_{CYCLE}^{OPT}$ is the value of $P_{CYCLE}$ calculated with $T_{DELAY}$ and K optimal, and $P_{TRANSD}^{MAX}$ is given by $(V_{TRANSD})^2/4R_S$.

Optimization of the value of $P_{CYCLE}$ enables an optimal value of the time interval $T_{DELAY}$ to be obtained (and vice versa) as a function of the value of $V_{TRANSD}$ and $V_{OUT}$.

However, the applicant has found that the dependence of $T_{DELAY}$ upon $V_{TRANSD}$ and $V_{OUT}$ is irrelevant for practical purposes, and the value of coupling efficiency $\eta_{COUPLE}$ reaches values higher than 95% for values of $V_{TRANSD}$ and $V_{OUT}$ of practical interest.

Figure 6:
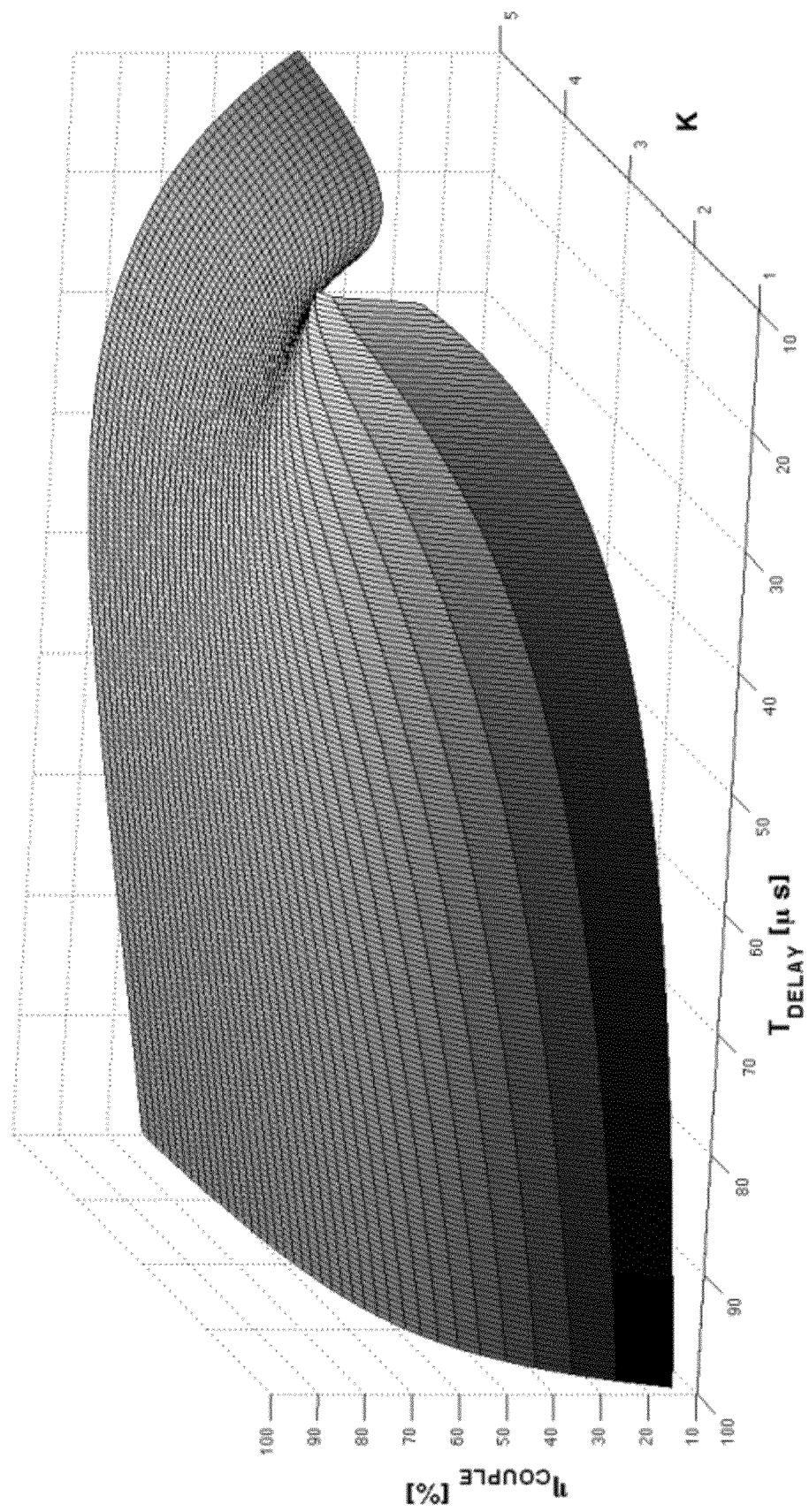
FIG. 6 shows the plot of the coupling factor between the transducer and the scavenging-interface circuit of FIG. 3, as operating parameters vary.

FIG. 6 shows the plot of the coupling efficiency $\eta_{COUPLE}$ as the values $T_{DELAY}$ and K vary. The graph of FIG. 6 can be easily obtained starting from the formula previously indicated for $P_{CYCLE}$ and varying the parameters $T_{DELAY}$ and K (fixing the values of the external variables $V_{TRANSD}$ and $V_{OUT}$). At each value of $\eta_{COUPLE}$ there corresponds a pair of values $T_{DELAY}$ and K. It is hence possible to obtain in an automatic way the pair of optimal values $T_{DELAY}$ and K to obtain a desired value of coupling efficiency $\eta_{COUPLE}$.

Figure 7:
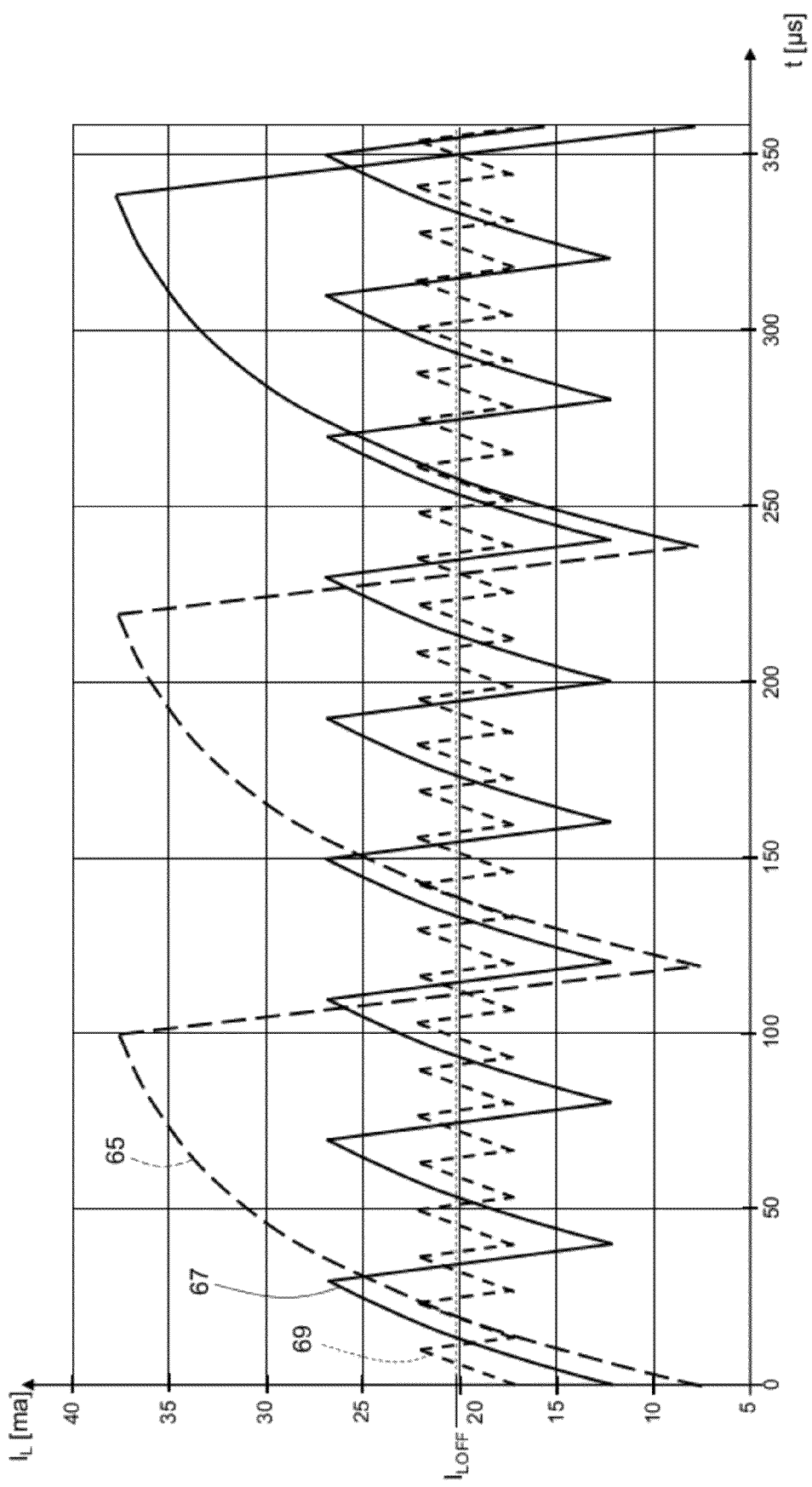
FIG. 7 shows profiles of storage/discharge of current in the energy harvesting system in the operating conditions of FIGS. 4*a* and 4*b*.

FIG. 7 shows profiles of current $I_L$ in the inductor 22b as the values chosen for $T_{DELAY}$ and K vary, and with reference to an optimal ideal current value $I_L^{OPT}$ (maximum coupling efficiency).

In particular, the curve 65 shows the cyclic evolution, in time t, of the profiles of current $I_L$ for high values of $T_{DELAY}$ and K (for example, $T_{DELAY}$=100 µs and K=5).

In this case, there is the advantage that the frequency of opening/closing of the first 30, second 36, third 31 and fourth 38 transistors is low; this results in a reduced consumption of energy by the rectifier circuit 24 in use. However, the peak current values $I_p$ reached by the current $I_L$ according to the curve 65 are high, and the impedance matching between the transducer 22 and the rectifier circuit 24 is not optimal, thus causing a relatively low coupling efficiency $\eta_{COUPLE}$.

The curve 67 shows the cyclic evolution, in time t, of the profiles of current $I_L$ for average values of $T_{DELAY}$ and K (for example $T_{DELAY}$=30 µs and K=2.25). In this case, the frequency of opening/closing of the first 30, second 36, third 31 and fourth 38 transistors is greater than in the case of the curve 65, but there is the advantage that the peak current values are lower than in the case of the curve 65, and the coupling efficiency is high ($\eta_{COUPLE} \approx 96.5\%$).

Finally, the curve 69 shows the cyclic evolution, in time t, of the profiles of current $I_L$ for small values of $T_{DELAY}$ and K (for example, $T_{DELAY}$=10 µs and K=1.3). In this case, the coupling efficiency $\eta_{COUPLE}$ is still greater than in the case of the curve 67 (approximately 99.5%), but with the disadvantage that the control frequency of the first 30, second 36, third 31, and fourth 38 transistors is excessively high, causing an excessive consumption of current by the rectifier circuit 24, with consequent reduction in the efficiency factor $\eta_{SCAV}$ that is not sufficiently compensated by the increase in the value of coupling efficiency $\eta_{COUPLE}$.

For the purposes of the application of the rectifier circuit 24 as energy scavenging interface in an environmental-energy harvesting system, a compromise choice, such as for example that of the curve 67, is preferable.

It is evident that other contexts of application of the present circuit can lead to a different choice of the values of $T_{DELAY}$ and K (and in general with K≥1).

Figure 8:
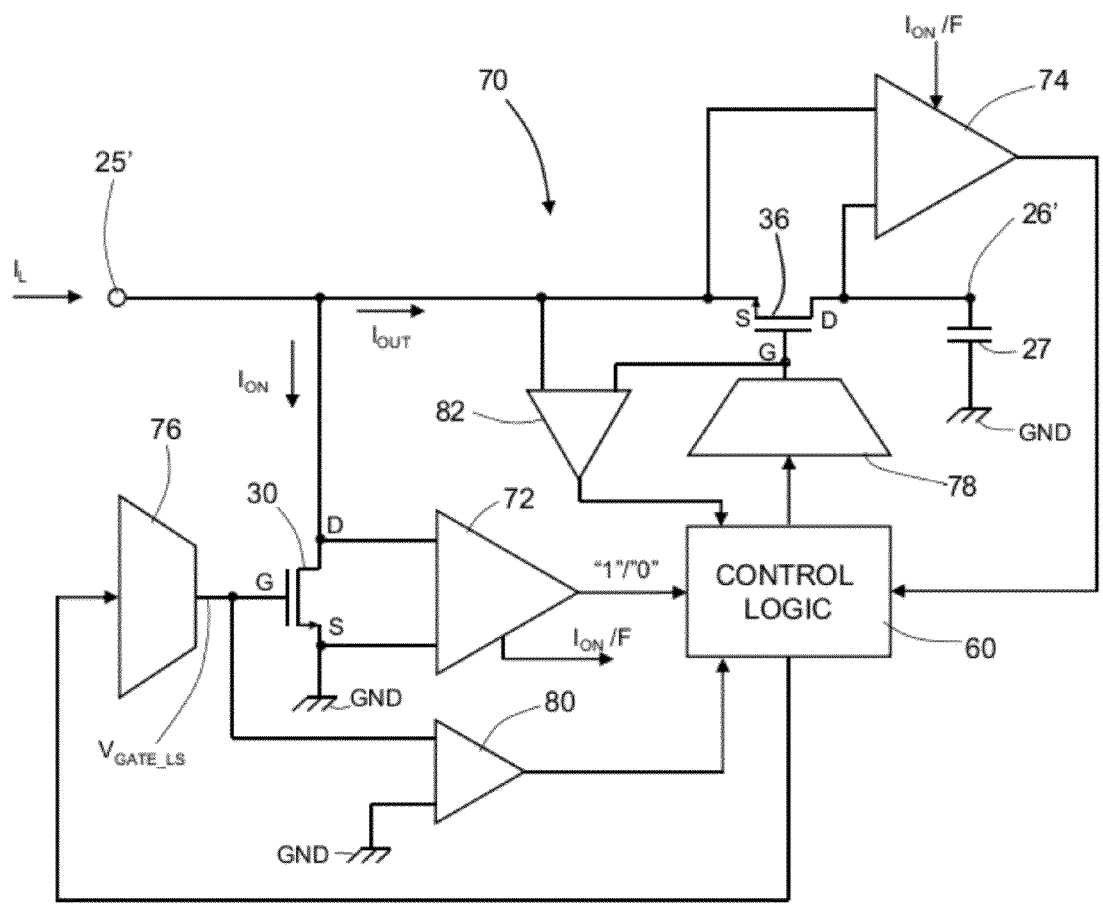
FIG. 8 shows a circuit for management and control of the scavenging-interface circuit of FIG. 3 that can be used for positive half-waves of the signal at input to the scavenging-interface circuit.

FIG. 8 shows, by means of functional blocks, a control circuit 70 of the first transistor 30 and of the second transistor 36, adapted to operate the first transistor 30 and the second transistor 36 in order to implement the operating conditions of FIGS. 4a and 4b.

The control circuit 70 operates, in particular, for positive half-waves of the input signal $V_{IN}$. In order to operate the third transistor 31 and the fourth transistor 38 for negative half-waves of the input signal $V_{IN}$, a circuit architecture similar to the one shown for the control circuit 70 is used.

The control circuit 70 is configured for operating both the first transistor 30 and the second transistor 36.

A circuit similar to the control circuit 70 (not shown in the figure) is used for operating in a similar way the third transistor 31 and the fourth transistor 38.

In greater detail, the control circuit 70 comprises a first current detector 72, coupled between the source terminal S and the drain terminal D of the first transistor 30, for detecting (during the step of FIG. 4a) when the current $I_{ON}$ that flows through the first transistor 30 exceeds the threshold $I_{TH}$.

A first portion of the current detector 72 comprises a comparator 86 (FIG. 9) configured for receiving at input the voltage signals present on the source terminal S (offset by a reference threshold) and on the drain terminal D of the first transistor 30 and generating at output a digital signal that assumes a low logic level when $I_{ON} < I_{TH}$ and a high logic level when $I_{ON} \geq I_{TH}$ (or vice versa). The signal at output from the comparator 86 is supplied to the control logic 60, which, once the time interval $T_{DELAY}$ has elapsed, opens the switch 30. The time interval $T_{DELAY}$ can be, indifferently, monitored by the control logic 60 or by the current detector 72 itself. In this latter case, the signal at output from the comparator 86 assumes a high logic level when $I_{ON} \geq I_{TH}$ and $t \geq T_{DELAY}$ and the control logic 60 opens the switch 30 on the rising edge of the digital signal generated by the comparator 86.

A second portion of the current detector 72 comprises a negative-feedback loop including an amplifier 89 (FIG. 9) configured for receiving at input the voltage signals present at the source terminal S and at the drain terminal D of the first transistor 30 and generating at output a current signal proportional to the current $I_{ON}$ that flows through the first transistor 30; in particular, the current signal generated at output is a fraction 1/F of the current $I_{ON}$.

The control circuit 70 further comprises a second current detector 74, coupled to the source terminal S and to the drain terminal D of the second transistor 36. The second current detector 74 is similar to the first current detector 72 and is configured for detecting the value of current that flows through the second transistor 36, during the operating step of FIG. 4b. In particular, the second current detector 74 co-operates with the control logic 60 in order to detect whether the current $I_{OUT}$ reaches the minimum value envisaged $I_{OFF} = I_p/K$. The output signal of the second current detector 74, indicating the value of current $I_{OUT}$, is supplied at input to the control logic 60.

The second current detector 74 receives at input the current $I_{ON}/F$ (generated by the first current detector 72, as described previously), and hence knows the value of peak current $I_p$. The second current detector 74 can hence detect when the current in the second transistor 36 reaches the minimum value envisaged $I_{OFF} = I_p/K$.

The control circuit 70 further comprises a first driving device 76 and a second driving device 78, which are coupled between the control logic 60 and the control terminal G of the first transistor 30 and of the second transistor 36, respectively. The first driving device 76 and the second driving device 78 are, in themselves, of a known type, and are adapted to control the first and second transistors 30, 36 in opening/closing on the basis of a control signal that they receive from the control logic 60. In particular, in the operating condition of FIG. 4a, the control logic 60 drives, via the first driving device 76, the first transistor 30 into the closed state and, via the second driving device 78, the second transistor 36 into the open state. When, on the basis of the signal generated at output by the first current detector 72, the control logic 60 detects that the current $I_L = I_{ON}$ has reached (and/or exceeded) the threshold value $I_{TH}$, and the time $T_{DELAY}$ has elapsed, the control logic 60 drives, via the first driving device 76, the first transistor 30 into the open state and, via the second driving device 78, the second transistor 36 into the closed state. Then, the control logic 60 monitors, on the basis of the signal received by the second current detector 74, the value of the current $I_{OUT}$ for controlling passage from the current operating condition (supply of the load, FIG. 4b) to the operating condition of storage of energy in the inductor 22b (FIG. 4a), as soon as the current $I_{OUT}$ reaches the value $I_{OFF}$.

The control circuit 70 further comprises a first voltage detector 80 and a second voltage detector 82, which are respectively coupled between the control terminal G and source terminal S of the first transistor 30 and of the second transistor 36. The first voltage detector 80 detects the voltage present between the control terminal G and source terminal S of the first transistor 30 and generates an output signal indicating said voltage. The output signal generated by the first voltage detector 80 is supplied to the control logic 60. In a similar way, the second voltage detector 82 detects the voltage present between the control terminal G and source terminal S of the fourth transistor 36 and generates an output signal indicating said voltage.

On the basis of the signals received by the first and second voltage detectors 80, 82, the control logic 60 knows the on/off state of the first and second transistors 30, 36 and controls passage from the operating condition of FIG. 4a to the operating condition of FIG. 4b (and vice versa) inserting appropriate dead times between opening (closing) of the first transistor 30 and closing (opening) of the second transistor 36. There are thus prevented phenomena of cross conduction and direct connection between the first output terminal 26' (to which the capacitor 27/load 28 is coupled) and the terminal at ground reference GND.

What has been described herein, both from a circuit standpoint and from the standpoint of method for operating the control circuit 70, may be applied, in a corresponding way that is evident for a person skilled in the branch, to the third transistor 31 and to the fourth transistor 38, which are operated for rectifying negative half-waves of the voltage $V_{TRANSD}$.

Figure 9:
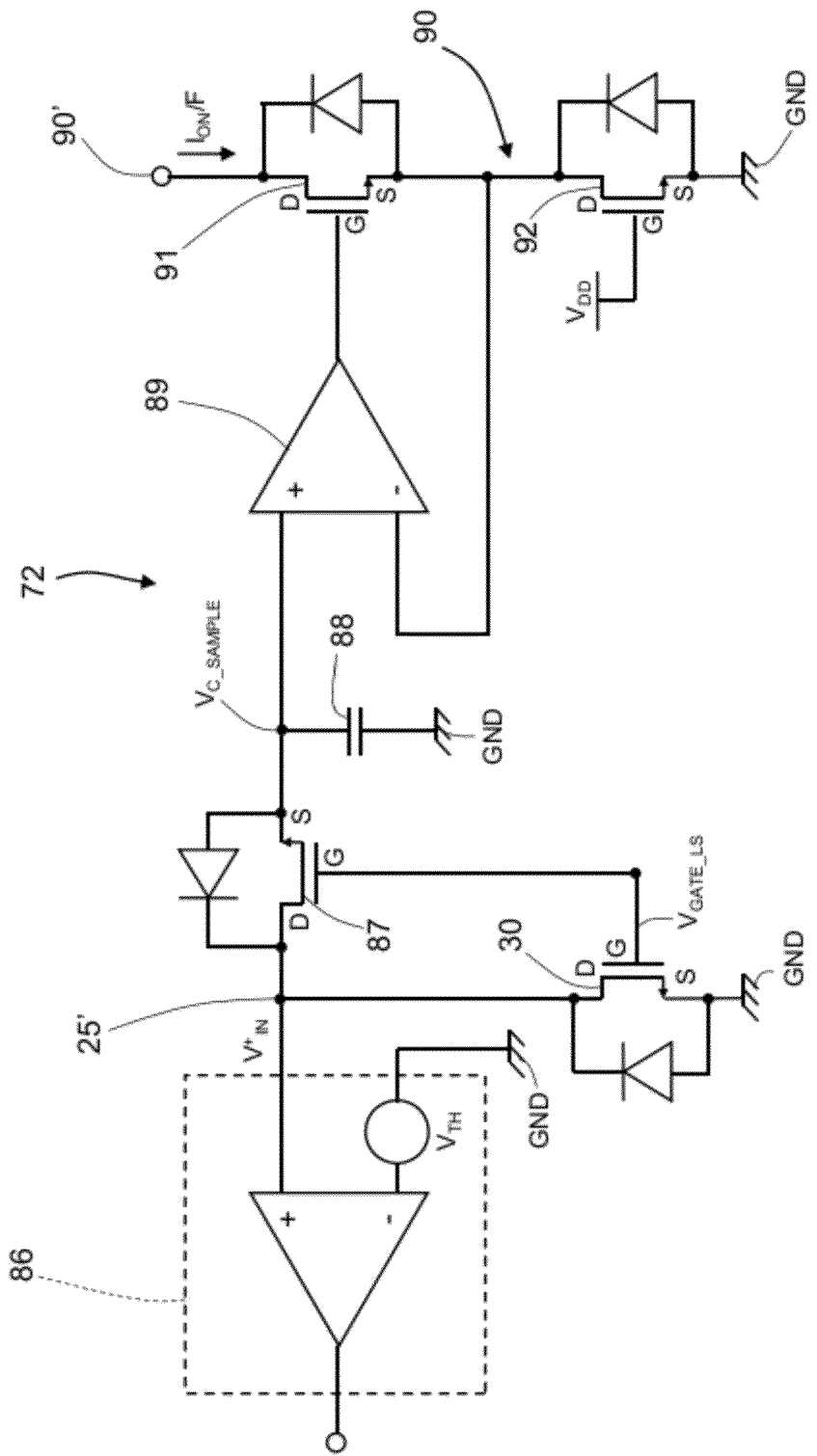
FIG. 9 shows, in greater detail, a portion of the management and control circuit of FIG. 8.

FIG. 9 shows, according to one embodiment of the present invention, the first current detector 72. According to the embodiment of FIG. 9, the first current detector 72 further comprises means adapted to store the peak value $I_p$ of the current $I_{ON}$ that traverses, in use, the first transistor 30. FIG. 9 moreover shows, coupled to the first current detector 72, a comparator 86, which, in co-operation with the control logic 60, has the task of detecting whether the current $I_L = I_{ON}$ reaches (or exceeds) the threshold value $I_{TH}$ set.

The comparator 86 is configured for receiving, at input to the non-inverting terminal, the voltage signal present on the input terminal 25' of the rectifier circuit 24 (signal $V_{IN}^+$), and, at input to the inverting terminal, a threshold-voltage signal $V_{TH}$ such that $V_{TH} = I_{TH} \cdot R_{ON}$, where, as has already been said, $R_{ON}$ is the on-state resistance of the first transistor 30. When the voltage $V_{IN}$ exceeds the threshold given by $V_{TH}$, the output of the comparator 86 changes state, signaling that the threshold has been exceeded (and hence indicating that $I_L = I_{ON} \geq I_{TH}$).

The first current detector 72 comprises a transistor 87 and a capacitor 88. The transistor 87 is connected between the first input terminal 25' of the rectifier circuit 24 and a terminal of the capacitor 88. The other terminal of the capacitor 88 is connected to the reference terminal GND. The control terminal G of the transistor 87 is connected to the control terminal G of the first transistor 30. In this way, the first transistor 30 and the transistor 87 are driven into the open/closed state by the same signal.

During the time interval $T_{DELAY}$ (situation of FIG. 4a), the first transistor 30 is closed (the signal $V_{GATE\_LS}$ has a high value and drives the first transistor 30 into the closed state). Likewise, also the transistor 87, is closed. The capacitor 88 is consequently charged to the voltage present on the first input terminal 25' of the rectifier circuit 24.

The first current detector 72 moreover comprises a further comparator 89 and a branch 90 including a transistor 91 and a transistor 92, which are connected in series to one another between a terminal 90' and the reference terminal GND. In particular, the transistor 92 has its own control terminal G connected to a supply terminal at high voltage $V_{DD}$.

The comparator 89 receives at input to the non-inverting terminal the signal $V_{IN}^+$ present on the first input terminal 25' of the rectifier circuit 24, and at input to the inverting terminal the signal present on the drain terminal of the transistor 92 and controls the control terminal G of the transistor 91. The negative feedback ensures that the signal at input to the non-inverting terminal of the comparator 89 and the signal at input to the inverting terminal of the comparator 89 are the same as one another so that the first transistor 30 and the transistor 92 will have the same source-drain and source-gate voltage. The current that flows through the transistor 92 consequently reaches the peak value (scaled by a factor F with respect to the corresponding peak value of $I_{ON}$) at the end of the time interval $T_{DELAY}$. When the first transistor 30 is open, also the transistor 87 is open, and the capacitor 88 is in a floating state, thus ensuring a current $I_{ON}/F$ through the transistor 92 having a practically constant value equal to the scaled peak value $I_p/F$ during the time interval $T_{CHARGE}$ (see FIG. 10a).

The scale factor F is obtained by sizing the transistors 30 and 92 in an appropriate way so that the transistor 92 will have dimensions F times smaller than the transistor 30 and will be adapted to conduct a current F times lower than $I_{ON}$.

FIGS. 10a and 10b are graphic illustrations of the time plots of the signal $V_{IN}^+$, of the voltage signal $V_{C\_SAMPLE}$ across the capacitor 88, and of the signal $V_{GATE\_LS}$ applied to the control terminals G of the first transistor 30 and of the transistor 87.

At the end of $T_{CHARGE}$ the voltage $V_{C\_SAMPLE}$ drops to the value $I_{OFF} \cdot R_{ON}$, where $R_{ON}$ is the on-state resistance of the first transistor 30.

Shown in FIG. 10a, plotted on top of one another, the signal $V_{IN}$ (dashed line) and the signal $V_{C\_SAMPLE}$ (solid line), which coincide.

Figure 11:
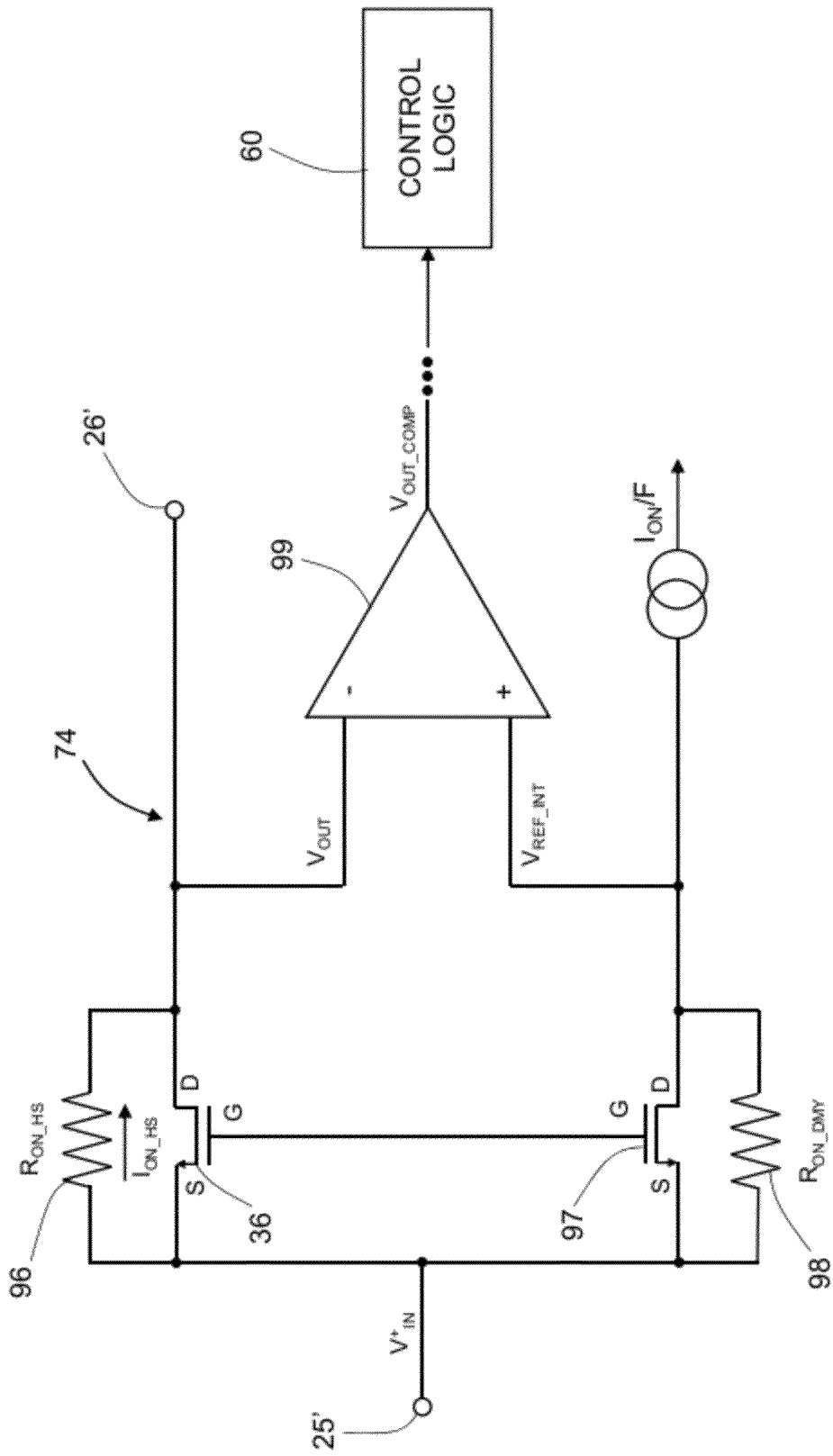
FIG. 11 shows, in greater detail, a further portion of the management and control circuit of FIG. 8.

FIG. 11 shows, in greater detail, the second current detector 74. The second current detector 74 of FIG. 11 comprises a transistor 97, having a source terminal S connected to the first input terminal 25' of the rectifier circuit 24, a control terminal G connected to the control terminal G of the second transistor 36, and a drain terminal D. Shown in parallel to the transistor 97 is a resistor 98 representing the on-state electrical resistance $R_{ON\_dmy}$ of the transistor 97. Likewise, also the second transistor 36 is shown with its own on-state electrical resistance $R_{ON\_hs}$ connected in parallel (resistor 96).

The second current detector 74 further comprises a comparator 99, having an inverting terminal connected to the drain terminal of the second transistor 36, and a non-inverting terminal connected to the drain terminal of the transistor 97.

The transistor 97 is a replica, scaled by a factor J, of the second transistor 36.

The intermediate voltage signal $V_{ref\_int}$ at input to the comparator 99 (non-inverting terminal) is given by $$V_{ref\_int} = V_{IN}^+ - J \cdot R_{ON\_hs} \cdot I_p / F$$

The voltage signal $V_{OUT}$ at input to the comparator 99 (inverting terminal) is given by $$V_{OUT} = V_{IN}^+ - R_{ON\_hs} \cdot I_{ON\_hs}$$

where $I_{ON\_hs}$ is the current that flows through the second transistor 36 when it is on.

It follows that, since the condition that determines the change of the output of the comparator 99 is $V_{ref\_int} = V_{OUT}$, the value of $I_{ON\_hs}$ at which there is a change of output of the comparator 99 is precisely the value of current $I_{OFF}$ introduced previously. Consequently, if we assume that $I_{OFF} = I_{ON\_hs}$, we obtain $I_{OFF} = J/F \cdot I_p$, and, if we define K=F/J, we obtain the condition indicated previously ($I_{OFF}=I_p/K$), which determines the threshold of passage from the operating condition of FIG. 4b to the operating condition of FIG. 4a.

FIGS. 12a-12c show, using one and the same time scale: the plots of the signals $V_{IN}$, $V_{ref\_int}$, $V_{OUT}$ (FIG. 12a); the plot of the signal $V_{out\_comp}$ generated at output by the comparator 99 (FIG. 12b); and the plot of the current signal $I_L$ (FIG. 12c).

With reference to FIG. 12a, it may be noted that corresponding to an (ideal) rising edge of the input signal $V_{IN}^+$ is a progressive drop of the signal $V_{ref\_int}$ and a corresponding progressive rise of the signal $V_{OUT}$. Hence, with further reference to FIG. 12b, when $V_{ref\_int}=V_{OUT}$ (instant $t_x$), the output $V_{out\_comp}$ of the comparator 99 changes state and passes from a low-value state to a high-value state. The change of state is recognized by the control logic 60, which controls appropriately the third and fourth switches 31, 36 as described previously.

FIG. 12c shows the current $I_L$, in particular during the time interval $T_{CHARGE}$ (operating condition of FIG. 4b). The current $I_L=I_{OUT}$ decreases from a maximum value $I_P$ to a minimum value $I_{OFF}$, supplying the capacitor 27/load 28.

What has been described previously applies, in an altogether equivalent way, to control of the third and fourth transistors 31, 38 for negative polarities of the input voltage $V_{IN}$.

The control logic 60 implements the method for controlling the first 30, second 36, third 31, and fourth 38 transistors described previously and shown schematically in FIG. 13, by means of a flowchart.

Figure 13:
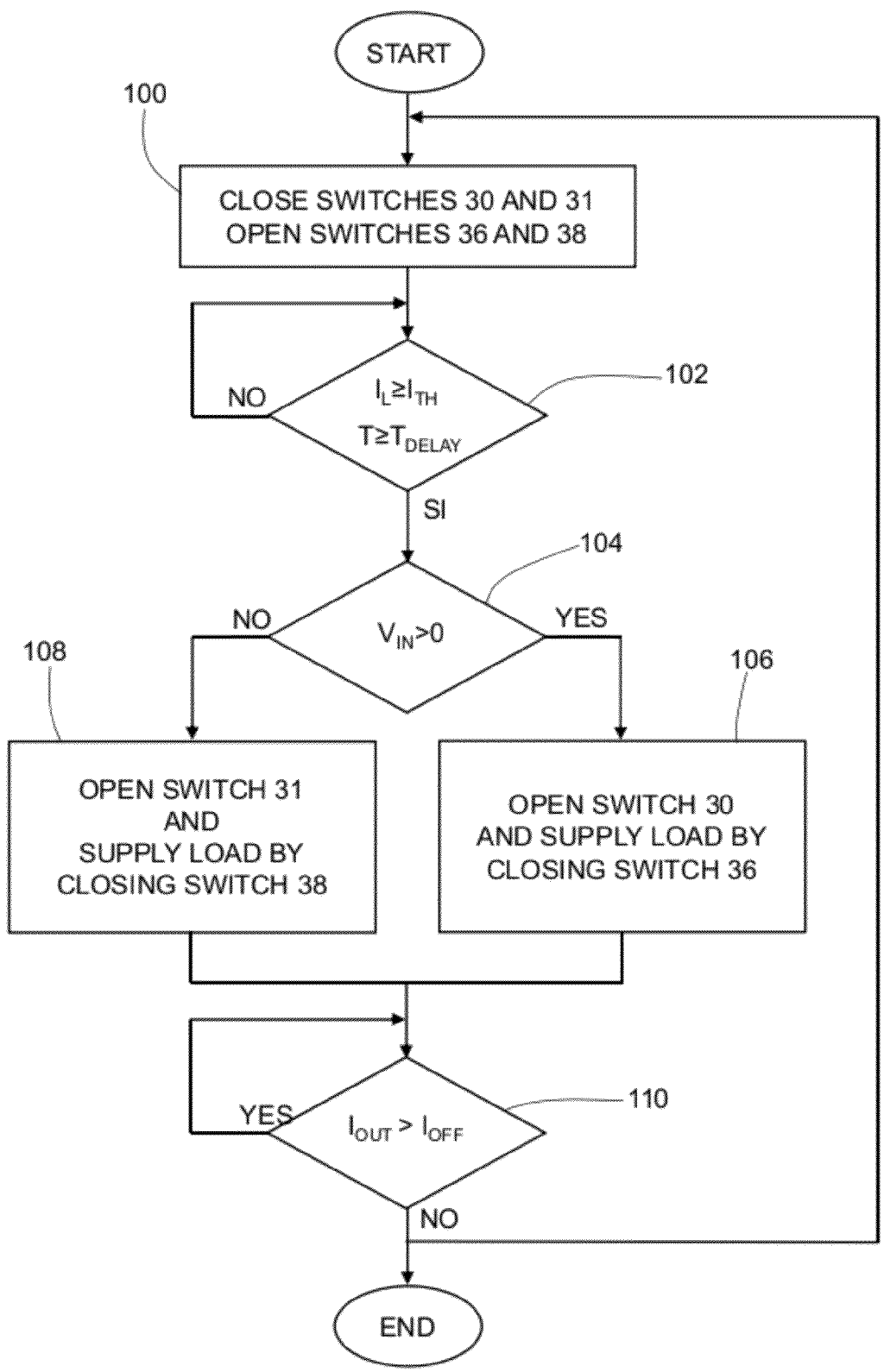
FIG. 13 shows, by means of a flowchart, steps of a method for operating the energy harvesting system of FIG. 3, according to one embodiment of the present invention.

With reference to FIG. 13 (step 100), the first and third transistors 30 and 31 are closed. The second and fourth transistors 36, 38, instead, are open. In this way, the inductor 22b is charged via the current $I_L=I_{ON}$ that flows through the first and third transistors 30, 31.

The value of current $I_L=I_{ON}$ is monitored (step 102) for detecting whether it reaches (or exceeds) the threshold value $I_{TH}$ required. At the same time, the control logic 60 monitors the time interval $T_{DELAY}$. In this case, time $t_0$ of start of the time interval $T_{DELAY}$ corresponds to the instant of closing of the first and third transistors 30, 31, according to step 100.

In the case where the current $I_L$ has not reached the threshold $I_{TH}$ or the time $T_{DELAY}$ has not elapsed (output NO from step 102), the control logic 60 waits for both of these conditions to be satisfied and maintains the system 20 in the states 100, 102 until the condition $I_L \geq I_{TH}$ is satisfied. Otherwise (output YES from step 102), control passes to the next step 104.

During step 104 a check is made to verify whether the input voltage $V_{IN}$ has a positive polarity. This operation can be carried out by means of the comparator 86, which receives at input the signal $V_{IN}$. As has already been said, a circuit equivalent to the one shown in FIG. 9 is coupled (in a way not shown in the figure) to the third switch 31 and is likewise used to verify whether the input voltage $V_{IN}$ has a negative polarity.

In the case where the input voltage $V_{IN}$ has a positive polarity, control passes to step 106 (output YES from step 104), where the first transistor 30 is opened to supply the capacitor 27/load 28 via the second transistor 36.

In the case where the input voltage $V_{IN}$ has a negative polarity, control passes, instead, to step 108 (output NO from step 104), where the third transistor 31 is opened to supply the capacitor 27/load 28 via the fourth transistor 38.

Output from steps 106 and 108 leads to step 110, where the control logic 60 monitors the value of current $I_{OUT}$ that flows through the second transistor 36 (or the fourth transistor 38, according to the polarity of the input voltage $V_{IN}$) towards the output of the rectifier 24 in order to detect whether the current $I_{OUT}$ assumes a value equal to $I_{OFF}$. As long as $I_{OUT} > I_{OFF}$, the control logic 60 maintains the system 20 in the step of charging of the capacitor 27/supply of the load 28. When $I_{OUT}=I_{OFF}$, control returns to step 100. Steps 100-104 are carried out, as described with reference to FIGS. 5a-5c, in a time interval equal to $T_{DELAY}$, whilst steps 106-110 are carried out in a time interval equal to $T_{CHARGE}$.

The control logic 60 is, for example, a microcontroller, configured for driving the first, second, third, fourth transistors 30, 31, 36 and 38 in order to perform the steps of the method of FIG. 13.

Figure 14:
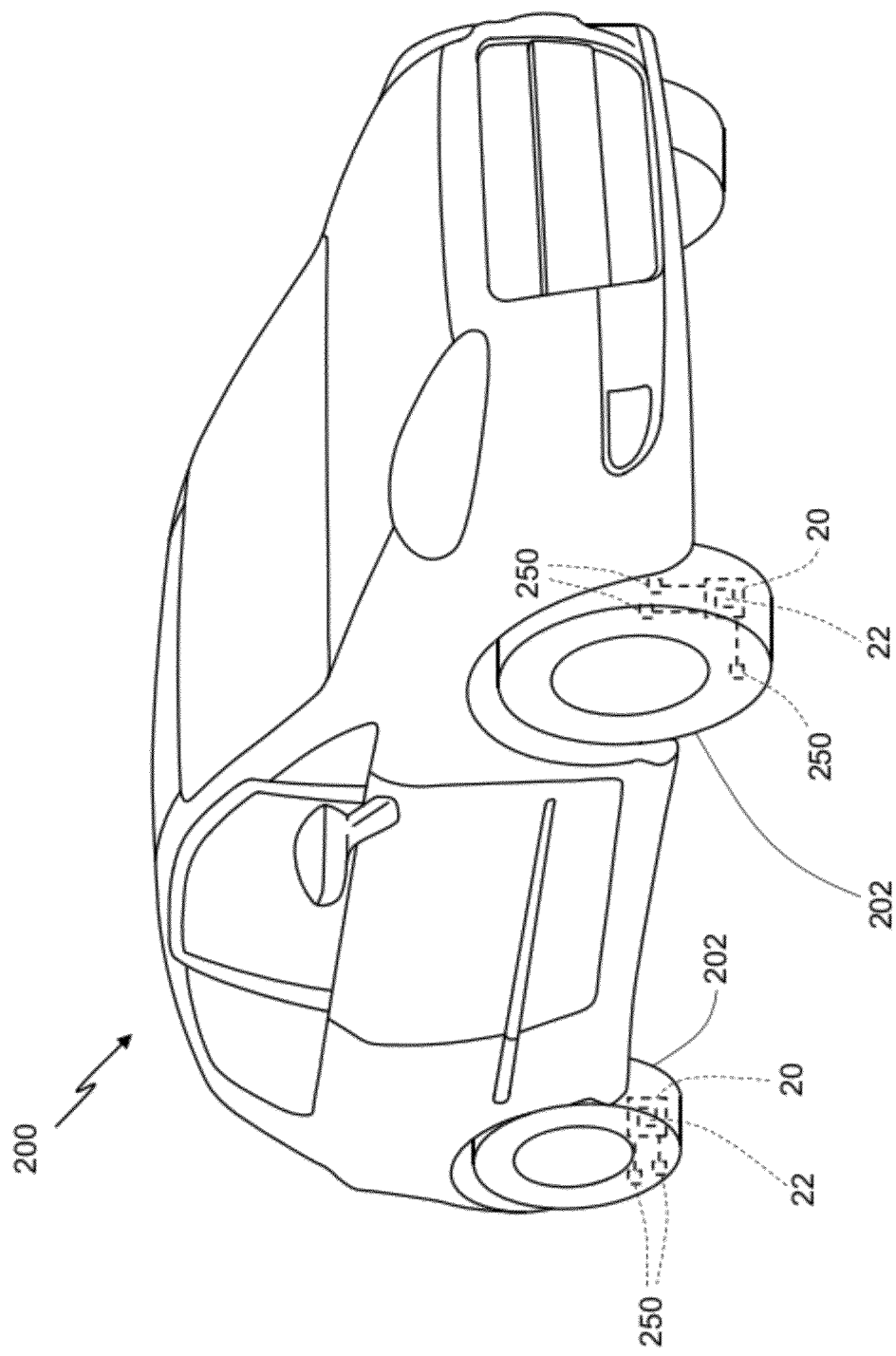
FIG. 14 shows a vehicle comprising the energy harvesting system of FIG. 3.

FIG. 14 shows a vehicle 200 comprising the energy harvesting system 20 of FIG. 3. The vehicle 200 is, in particular, an automobile. It is evident, however, that the energy harvesting system 20 can be used in any vehicle 200 or in systems or apparatuses other than a vehicle. In particular, the energy harvesting system 20 can find application in generic systems in which it is desirable to harvest, store, and use environmental energy, in particular by means of conversion of mechanical energy into electrical energy.

With reference to FIG. 14, the vehicle 200 comprises one or more transducers 22 coupled in a known way to a portion of the vehicle 200 subjected to mechanical stresses and/or vibrations, for converting said mechanical stresses and/or vibrations into electric current.

The energy harvesting system 20 is connected to one or more electrical loads 28a, . . . , 28n, for example via interposition of a DC-DC converter. In particular, according to an application, the electrical loads 28a, . . . , 28n comprise TPM (tire-parameter monitoring) sensors 250 for monitoring parameters of tires 202. In this case, the TPM sensors 250 are coupled to an internal portion of the tires 202 of the vehicle 200. Likewise, also the transducers 22 (for example, of an electromagnetic or piezoelectric type) are coupled to an internal portion of the tires 202. The stress of the transducers 22 when the vehicle 200 is travelling causes the production of an electrical current/voltage signal at output from the transducer 22 by means of conversion of the mechanical energy into electrical energy. The electrical energy thus produced is stored, as has been described previously, in the storage element 27 and supplied, via the DC-DC converter possibly present, to the TPM sensors 250.

According to one embodiment, the energy harvesting system 20, comprising one or more transducers, and the TPM sensors 250, are glued within one or more tires 202. The impact of the tires 202 on the ground during motion of the vehicle 200 enables production of electrical energy.

As an alternative to what is shown in FIG. 14, the energy harvesting system 20 can be set in any other portion of the vehicle 200, and/or be used for supplying an electrical load different from or additional to the TPM sensors 250.

Another possible application of the energy harvesting system 20 is the generation of electrical energy by exploiting the mechanical energy produced by an individual when he is walking or running. In this case, the energy harvesting system 20 is located inside the shoes of said individual (for example, inside the sole). In systems aimed at fitness, where it is particularly interesting to count the steps, it is useful to recover energy from the vibrations induced by walking/running to be able to supply, without using a battery, acceleration sensors and/or RFID transmitters capable of communicating with cellphones, music-playing devices, or any other apparatus involved in information on the steps performed.

From an examination of the characteristics of the invention obtained according to the present disclosure the advantages that it affords are evident.

In particular, since the duration of the time interval $T_{DELAY}$ is (typically) constant, the rectifier 24 operates at constant duty cycle of the signal of opening/closing of the first and second switches 30, 31; this enables values of efficiency $\eta_{SCAV}$ (efficiency of the rectifier 24, having the function of scavenging interface of the system 20) to be obtained that are particularly high (the applicant has found values of efficiency higher than 95% irrespective of the values assumed by $V_{TRANSD}$ and $V_{OUT}$).

The harvesting efficiency is likewise high also when the amplitude of the signal $V_{TRANSD}$ of the transducer 22 is lower than the voltage value stored in the capacitor 27, thus overcoming a limitation of the diode-bridge rectifier architecture.

In addition, since in the case of a transducer 22 of an electromagnetic type the rectifier 24 exploits the inductor 22b of the transducer 22, the harvesting efficiency is high even when the amplitude of the signal of the transducer is low. In this way, the limitation imposed by the diode-bridge rectifiers, which require a voltage of the transducer $V_{TRANSD}$ greater than $2V_{TH\_D}$, where $V_{TH\_D}$ is the threshold voltage of the diodes of the rectifier, is overcome.

Using a HV (high voltage) technology for the capacitor 27 and for the scavenging interface it is possible to store high voltages, and hence high energy, in the capacitor, consequently increasing the autonomy of operation of the TPM sensors 250.

The method described, which envisages the choice of an optimal value of $T_{DELAY}$ and K, enables implementation of an active control (of the mean value and of the ripple) of the current supplied by the transducer, and enables an optimal impedance matching to be obtained between the transducer 22 and the scavenging interface 24. This ensures a high efficiency $\eta_{SCAV}$ of the scavenging interface 24b irrespective of the speed of rotation of the tires 202 and of the conditions of storage of the energy in the capacitor 27.

In addition, as has been said, the value of the interval $T_{DELAY}$ can be varied according to the particular application in which the rectifier 24 operates. The rectifier 24 hence finds use in systems other than the energy harvesting system 20, which are based upon electromagnetic transducers of any type.

Moreover, the rectifier circuit 24 can be used with transducers of some other type, by interposition of an appropriate circuit between the transducer and the rectifier circuit adapted to provide an energy accumulator similar to the inductor 22b.

Finally, the rectifier 24 according to the present invention and the energy harvesting system 20 are of a completely integrated type, and consequently require a minimal space of installation.

Figure 1:
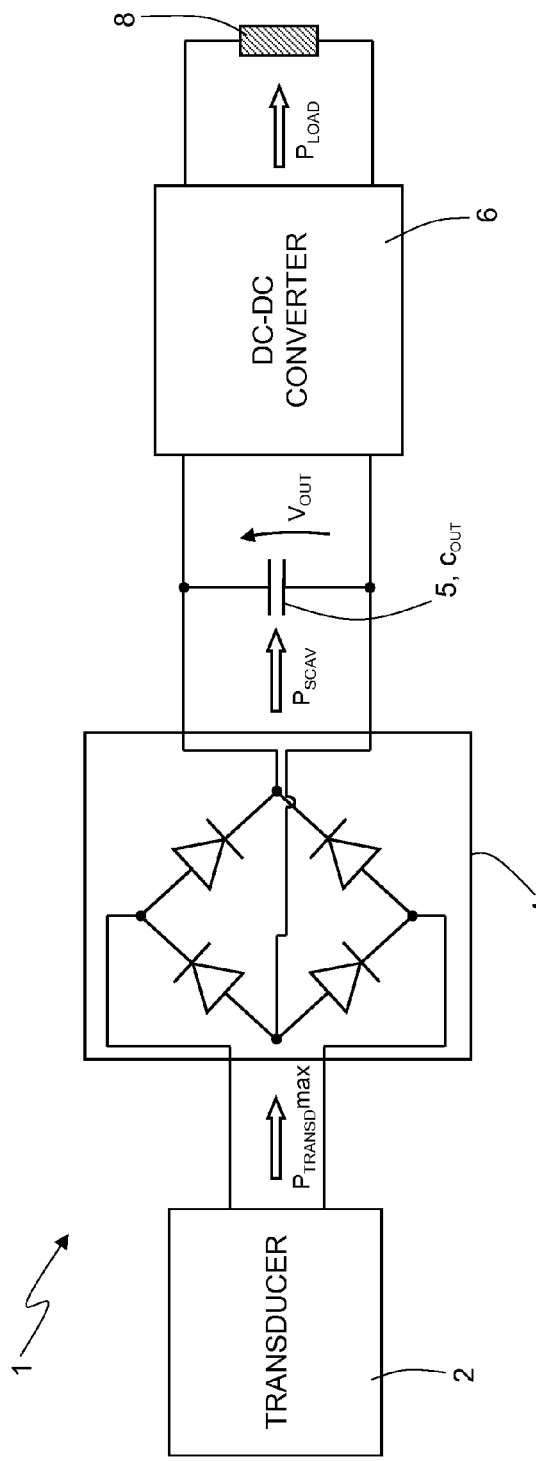
FIG. 1 shows an energy harvesting system according to a known embodiment.
Figure 2:
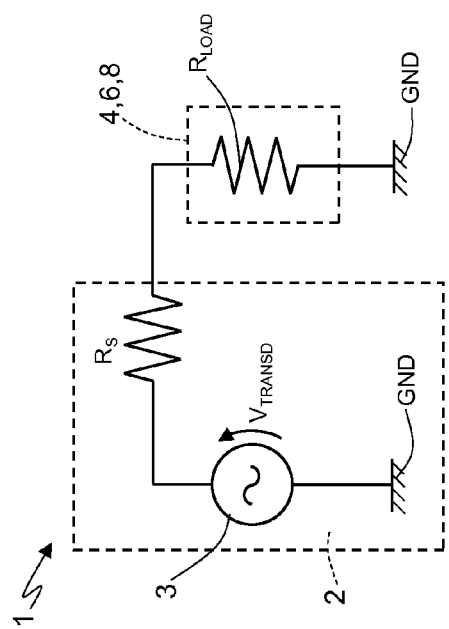
FIG. 2 shows a circuit equivalent to the energy harvesting system of FIG. 1.

Finally, the recovery of environmental energy occurs even when the signal of the transducer is lower than the voltage value accumulated on the output capacitor, which was not possible using a diode-bridge interface of a known type as shown in FIG. 1. According to the present invention, the scavenging interface 24 is hence capable of recovering energy even when the power supplied by the transducer is very low.

Finally, it is clear that modifications and variations may be made to what has been described and illustrated herein without thereby departing from the sphere of protection of the present invention, as defined in the annexed claims.

In particular, according to one embodiment, the rectifier circuit 24 can comprise a number of transistors different from the one described. For example, the rectifier circuit 24 can be a half-wave rectifier, comprising just two transistors (for example, just the first and second transistors 30 and 36, or else just the third and fourth transistors 31 and 38). Use of a half-wave rectifier may prove advantageous in the case where the input signal $V_{IN}$ is of a known type and comprises only positive (or negative) half-waves. Its use is, however, not recommended (even though possible) in energy harvesting systems in so far as part of the input signal would be lost, at the expense of the efficiency of the system as a whole.

In addition, the conditions $t > T_{DELAY}$ and $I_L > I_{TH}$ expressed with reference to the operating condition of FIG. 4a are not both necessary. In particular, for voltage signals generated by transducers 22 of a known type the voltage value reaches always peaks such as to enable the threshold $I_{TH}$ to be exceeded within the time $T_{DELAY}$. Furthermore, an appropriate choice of $T_{DELAY}$ always guarantees that, for practical purposes, a minimum acceptable threshold $I_{TH}$ is reached.

In addition, there may be present a plurality of transducers 22, all of the same type or of types different from one another, indifferently. For example, the transducer/transducers can be chosen in the group comprising: electrochemical transducers (adapted to convert chemical energy into an electrical signal), electromechanical transducers (adapted to convert mechanical energy into an electrical signal), electroacoustic transducers (adapted to convert variations of pressure into an electrical signal), electromagnetic transducers (adapted to convert a magnetic field into an electrical signal), photoelectric transducers (adapted to convert light energy into an electrical signal), electrostatic transducers, thermoelectrical transducers, piezoelectric transducers, thermoacoustic transducers, thermomagnetic transducers, or thermoionic transducers.

What is claimed is:

1. Apparatus, comprising:
an energy scavenging interface having a first input terminal and a second input terminal configured to receive an input current signal from an inductive storage element, and a first output terminal and a second output terminal, configured to supply an output current signal to an electrical load, the energy scavenging interface comprising: a first switch connected between the first input terminal and the second output terminal; a second switch connected between the first input terminal and the first output terminal; and
control logic configured to:
place the first switch in a closed state and the second switch in an open state for a first time interval having at least a first temporal duration in which the storage element stores electrical charge from the input current signal;
determine when both the first temporal duration expires and a current passing through the inductive storage element during the first time interval exceeds a first threshold current;
after said determination, place the first switch in an open state and the second switch in a closed state generating the output current signal; and
maintain the first switch in the open state and the second switch in the closed state as long as the current of the output current signal is greater than a second threshold current.

2. The apparatus of claim 1, further comprising a transducer of an electromagnetic type having an inductor functioning as said inductive storage element.

3. The apparatus of claim 1, wherein the input current signal has a first polarity and a second polarity of opposite sign with respect to one another, and wherein the scavenging interface further comprises a third switch connected between the second input terminal and the second output terminal, and a fourth switch connected between the second input terminal and the first output terminal, wherein said control logic is further configured to:

place, during the first time interval, for both polarities of the input current signal, the third switch into the closed state and the fourth switch into the open state;

place, when the electrical input signal has the second polarity, the third switch into the open state and the fourth switch into the closed state generating the output current signal for supplying the electrical load; and maintain the third switch in the open state and the fourth switch in the closed state as long as the output current signal is greater than the second threshold current.

4. The apparatus of claim 1, wherein said second threshold current corresponds to a peak value of the input current signal reduced by a scale factor, and wherein the first temporal duration and the scale factor have values which optimize the coupling efficiency at the input port of the energy scavenging interface.

5. The apparatus of claim 4, wherein the control logic is further configured to:

define said coupling efficiency as a function of the first temporal duration and of the scale factor;

acquire a plurality of values of coupling efficiency associated to a respective plurality of values of said first temporal duration and to a respective plurality of values of the scale factor; and identify a value of said first temporal duration and a value of the scale factor such as to optimize the coupling efficiency at the input port of the energy scavenging interface.

6. The apparatus of claim 1, wherein said first temporal duration is between approximately 1 µs and 100 µs.

7. The apparatus of claim 4, wherein the scale factor is a value greater than 1.

8. The apparatus of claim 1, further comprising a first current sensing circuit, coupled to opposite conduction terminals of the first switch, configured to sense, during the first time interval, when the input current signal received by the inductive storage element reaches said first threshold current, the control logic further configured to maintain the first switch in the closed state and the second switch in the open state until the first threshold current is reached.

9. The apparatus of claim 8, wherein the first current sensing circuit comprises:

a capacitor selectively coupled between the first input terminal and the second output terminal to acquire and store an electrical signal indicating a peak value of the input current signal;

a first current-scaling switch driven by said control logic into the open state and closed state together with the first switch and configured to carry an electric current having a value equal to a first fraction of the peak value.

10. The apparatus of claim 9, further comprising a second current sensing circuit, coupled to the first input terminal and to the first output terminal, configured to acquire the value of current of the output current signal that flows through the second switch and detect when the value of current of the output current signal reaches a value equal to said scaled copy of the peak value as said second current threshold, the second current sensing circuit including:

a second current-scaling switch driven by said control logic into the open state and closed state together with the second switch and configured to carry an electric current having a value equal to a second fraction of the current value of the output current signal;

a comparator configured to receive a first input signal indicative of the output current signal and a second input signal indicative of the electric current carried by the second current-scaling switch and supply a comparison signal indicative of a result of the comparison between the first and second input signals;

wherein the second current-scaling switch is traversed, during the second time interval, by an electric current having a value equal to the first fraction of the peak value, said comparison signal having a logic value identifying a value of the output current signal having reduced value of the scale factor that is given by the ratio between the first and second fractions of the peak value.

11. The apparatus of claim 3, further comprising a detecting device, coupled to the second input terminal and to the second output terminal, configured to detect whether the input current signal in the inductive storage element reaches the first threshold value, the control logic further configured to maintain the third switch in the closed state and the fourth switch in the open state until the input current signal in the storage element reaches the first threshold value.

12. The apparatus of claim 11, wherein the detecting device is further configured to:

acquire a peak value of the input current signal associated to electrical charge accumulated in the inductive storage element; and generate a scaled copy of the peak value acquired.

13. The apparatus of claim 12, further comprising a sensing device, coupled to the second input terminal and to the first output terminal, configured to:

acquire the value of current of the output current signal that flows through the fourth switch; and detect when the value of current of the output current signal that flows through the fourth switch reaches a value equal to said scaled copy of the peak value.

14. The apparatus of claim 1, further comprising:

a transducer configured to convert energy coming from an external energy source to said electrical signal; and another storage element coupled to the electrical-energy scavenging interface and configured to receive the output signal and store electrical energy.

15. The apparatus of claim 14, further comprising a DC-DC converter connected to the first storage element, said DC-DC converter configured to supply an electrical load via the electrical energy accumulated in the another storage element.

16. The apparatus of claim 14, wherein the transducer is supplied with energy from one of a vehicle and an item of sports footwear.

17. A method for scavenging energy by means of an energy scavenging interface having an input port configured to receive an input current signal from an inductive storage element, and an output port configured to supply an output current signal, the method comprising the steps of:

receiving at the input port the input current signal;

charging the storage element using the input current signal for a first time interval having at least a first temporal duration;

determining when both the first temporal duration expires and a current passing through the inductive storage element during the first time interval exceeds a first threshold current; and supplying the output current signal from the inductive storage element as long as the current of the output current signal is greater than a second threshold current.

18. The energy scavenging method according to claim 17, wherein the input current signal is supplied by a transducer of an electromagnetic type including an inductor functioning as the inductive storage element.

19. The energy scavenging method according to claim 17, further comprising charging the inductive storage element using the input current signal until the current in the inductive storage element reaches the first threshold current.

20. The energy scavenging method according to claim 17, further comprising the steps of:
  acquiring the peak value of the current passing through the inductive storage element;
  scaling by a scale factor said peak value to obtain a scaled copy; and
  identifying the first temporal duration and the scale factor such that the coupling efficiency between the transducer and the energy scavenging interface is optimal.

21. The energy scavenging method according to claim 20, wherein the identifying step comprises:
  defining said coupling efficiency as a function of the first temporal duration and of the scale factor; and
  acquiring a plurality of values of coupling efficiency associated to both a respective plurality of values of said first temporal duration and to a respective plurality of values of the scale factor.

22. The energy scavenging method according to claim 17, wherein the first temporal duration is between approximately 1 μs and 100 μs.

23. The energy scavenging method according to claim 20, wherein the first scale factor value is greater than 1.

24. The energy scavenging method according to claim 17, wherein the input port comprises a first input terminal and a second input terminal and the output port comprises a first output terminal and a second output terminal, the energy scavenging interface further comprising a first switch connected between the first input terminal and the second output terminal, and a second switch connected between the first input terminal and the first output terminal, wherein:
  the charging step comprises closing the first switch and opening the second switch; and
  the supplying step comprises opening the first switch and closing the second switch.

25. The energy scavenging method according to claim 17, wherein the input current signal has a first polarity and a second polarity of opposite sign with respect to one another, and wherein the input port comprises a first input terminal and a second input terminal and the output port comprises a first output terminal and a second output terminal, the energy scavenging interface further comprising a first switch connected between the first input terminal and the second output terminal, a second switch connected between the first input terminal and the first output terminal, a third switch connected between the second input terminal and the second output terminal, and a fourth switch connected between the second input terminal and the first output terminal, the method further comprising the step of:
  detecting whether the input current signal has the first polarity or the second polarity, and wherein:
  the charging step comprises closing the first and third switches and opening the second and fourth switches;
  when the input current signal has the first polarity, the supplying step comprises opening the first switch and closing the second switch; and
  when the electrical input signal has the second polarity, the supplying step comprises opening the third switch and closing the fourth switch.

26. Apparatus, comprising:
  an input node configured to receive an input current signal generated by a transducer having an inductive charge storage element;
  an output node;
  a reference node;
  a first transistor coupled between the input node and the reference node;
  a second transistor coupled between the input node and the output node;
  a first circuit configured to sense current flow through the first transistor;
  a second circuit configured to sense current flow through the second transistor; and
  a control circuit configured to control actuation of the first and second transistors in response to outputs produced by the first and second circuits, said control circuit operable to close the first transistor so as to store charge in the inductive charge storage element until both a first temporal duration from closing of the first transistor expires and said first circuit output indicates that sensed current flow through the first transistor has reached a first threshold and thereafter open the first transistor and close the second transistor so as to deliver stored charge to the output node until said second circuit output indicates sensed current flow through the second transistor has reached a second threshold.

27. The apparatus of claim 26, wherein said control circuit is operable to open the second transistor when the first transistor is closed.

28. The apparatus of claim 26, further comprising:
  wherein the transducer is configured to convert energy coming from an external source of energy to generate the input current signal for application to the input node; and
  an additional charge storage element coupled between the output node and the reference node.

29. The apparatus of claim 28, further comprising a DC-DC converter coupled between the additional storage element and an electrical load output node.

30. A method, comprising:
  (a) actuating a first transistor to pass current and store electrical energy in an inductive charge storage element of a transducer;
  (b) sensing current flow through the first transistor;
  (c) deactivating the first transistor when both a first temporal duration from actuation of the first transistor expires and sensed current flow through the first transistor reaches a first threshold;
  (d) thereafter actuating a second transistor to deliver stored electrical energy from the inductive charge storage element to an output;
  (e) sensing current flow through the second transistor;
  (f) deactivating the second transistor when the sensed current flow through the second transistor reaches a second threshold; and
  (g) returning to step (a).

31. The method of claim 30, wherein the steps of the method are implemented in response to execution of a program by a microcontroller.

* * * * *